(12) United States Patent
Gan et al.

(10) Patent No.: US 11,546,794 B2
(45) Date of Patent: Jan. 3, 2023

(54) QOS FLOW CONTROL PARAMETERS SIGNALING

(71) Applicant: Telefonaktiebolaget LM Ericsson (publ), Stockholm (SE)

(72) Inventors: Juying Gan, Shanghai (SE); Erik Wikström, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 408 days.

(21) Appl. No.: 16/482,369

(22) PCT Filed: Apr. 24, 2019

(86) PCT No.: PCT/CN2019/084134
§ 371 (c)(1),
(2) Date: Jul. 31, 2019

(87) PCT Pub. No.: WO2019/206191
PCT Pub. Date: Oct. 31, 2019

(65) Prior Publication Data
US 2021/0337421 A1    Oct. 28, 2021

(30) Foreign Application Priority Data

Apr. 28, 2018  (WO) ................ PCT/CN2018/085165

(51) Int. Cl.
*H04W 28/02* (2009.01)
*H04W 36/14* (2009.01)
*H04W 28/12* (2009.01)

(52) U.S. Cl.
CPC ....... *H04W 28/0268* (2013.01); *H04W 28/12* (2013.01)

(58) Field of Classification Search
None
See application file for complete search history.

(56) References Cited

U.S. PATENT DOCUMENTS

| 7,023,825 B1 | 4/2006 | Haumont et al. |
| 2011/0202485 A1 | 8/2011 | Cutler et al. |

(Continued)

FOREIGN PATENT DOCUMENTS

| CA | 3 025 578 A1 | 11/2017 |
| CN | 103533599 A | 1/2014 |

(Continued)

OTHER PUBLICATIONS

PCT Notification of Transmittal of the International Search Report and the Written Opinion of the International Searching Authority, or the Declaration issued for International application No. PCT/CN2019/084134—dated Jul. 24, 2019.

(Continued)

*Primary Examiner* — Sai Aung
(74) *Attorney, Agent, or Firm* — Baker Botts, LLP

(57) ABSTRACT

The present disclosure provides methods for signaling QoS Flow control parameters, and corresponding NF entities. The method comprises generating one or more data flow rules associated with a QoS Flow and a QoS Flow profile. The data flow rules include parameters specific to a data flow that belongs to the QoS Flow, while the QoS Flow profile includes parameters that are common to all data flows that belong to the same QoS Flow. The present disclosure further discloses a corresponding method of receiving the QoS Flow control parameters. The present disclosure further provides corresponding computer readable medium.

26 Claims, 16 Drawing Sheets

(56) References Cited

U.S. PATENT DOCUMENTS

| | | | | |
|---|---|---|---|---|
| 2014/0153391 | A1* | 6/2014 | Ludwig | H04L 41/0893 370/230 |
| 2015/0189539 | A1* | 7/2015 | Li | H04L 65/4084 370/230 |
| 2015/0201394 | A1* | 7/2015 | Qu | H04W 4/20 455/456.1 |
| 2016/0033045 | A1 | 2/2016 | Itadani et al. | |
| 2020/0275302 | A1* | 8/2020 | Youn | H04W 28/06 |

FOREIGN PATENT DOCUMENTS

| | | |
|---|---|---|
| CN | 107018542 A | 8/2017 |
| KR | 10-2008-0098301 A | 11/2008 |
| KR | 10-2008-0098302 A | 11/2008 |
| KR | 1020100112158 | 10/2010 |
| RU | 2523962 C2 | 7/2014 |
| WO | 2007 142565 A1 | 12/2007 |
| WO | 2008 136605 A2 | 11/2008 |
| WO | 2017 211289 A1 | 12/2017 |
| WO | 2018 070689 A1 | 4/2018 |

OTHER PUBLICATIONS

3GPP TSG SA WG2 Meeting #127bis; Newport Beach, California, USA; Change Request; Title: QoS rule structure improvement; Source to WG: Ericsson; Source to TSG: SA WG2 (S2-184888)—May 28-Jun. 1, 2018.

SA WG2 Meeting #127-bis; Newport Beach, CA, USA; Change Request; Title: Fixing the definition of signalled QoS rule; Source to WG: Intel, MediaTek Inc.; Source to TSG: SA WG2 (S2-186005, revision of S2-184809)—May 27-Jun. 1, 2018.

3GPP TSG-SA4 Meeting #94; Sophia Antipolis, France; Source: Intel; Title: Overview of 5G System Requirements and Architecture (S4-170521)—Jun. 26-30, 2017.

Korean Summary of the Notice of Preliminary Rejection issued for Korean Patent Application No. 2019-7021469—dated Aug. 21, 2020.

Examination Report No. 1 for Your Standard Patent Application issued by the Australian Government, IP Australia, for Application No. 2019204845—dated May 28, 2020.

3GPP TS 23.501 v15.1.0; Technical Specification; 3rd Generation Partnership Project; Technical Specification Group Services and System Aspects; System Architecture for the 5G System; Stage 2 (Release 15)—Mar. 2018.

3GPP TS 23.503 v15.1.0; Technical Specification; 3rd Generation Partnership Project; Technical Specification Group Services and System Aspects; Policy and Charging Control Framework for the 5G System; Stage 2 (Release 15)—Mar. 2018.

3GPP TS 24.501 v1.0.0; Technical Specification; 3rd Generation Partnership Project; Technical Specification Group Core Network and Terminals; Non-Access-Stratum (NAS) protocol for 5G System (5GS); Stage 3 (Release 15)—Mar. 2018.

3GPP TS 24.501 v15.1.0; Technical Specification; 3rd Generation Partnership Project; Technical Specification Group Core Network and Terminals; Non-Access-Stratum (NAS) protocol for 5G System (5GS); Stage 3 (Release 15)—Sep. 2018.

3GPP TSG-CT WG1 Meeting #110; Kunming (P.R. of China); Source: Huawei, HiSilicon, Nokia, Nokia Shanghai Bell, ZTE, Sharp; Title: QoS rules and mapped EPS bearer contexts (C1-182824)—Apr. 16-20, 2018.

Extended European Search Report issued for Application No./Patent No. 19735479.8-1215 / 3583800 PCT/CN2019084134—dated Jul. 31, 2020.

3GPP TS 23.501; Technical Specification; 3rd Generation Partnership Project; Technical Specification Group Services and System Aspects; System Architecture for the 5G System; Stage 2 (Release 15)—Apr. 2017.

Korean Notice of Patent Allowance issued for Patent customer No. 519986036812—dated Jan. 30, 2021.

Office Action issued for Japanese Application No. 2019-538421—dated Aug. 7, 2020.

SA WG2 meeting #116-BIS; Sanya, P.R. China; Title: Summary of email discussion on QoS framework; Source: Intel (email discussion convenor) (S2-164759)—Aug. 29-Sep. 2, 2016.

SA WG2 Meeting #112-bis; Sophia Antipolis, France; Source: ETRI; Title: TS 23.502: Updating PDU session modification for UE requested QoS control (S2-176005)—Aug. 21-25, 2017.

SA WG2 Meeting #124; Reno, Nevada, USA; Source: Huawei, Hisilicon; Title: TS23.502; Clarification about QoS flow management in PDU session related procedures (S2-179373)—Nov. 27-Dec. 1, 2017.

Examination Report No. 2 For Standard Patent Application issued by the Australian Government for Application No. 2019204845—dated Apr. 16, 2021.

Russia Patent Office Search Report in Russia Application No. 2019124328/07(047555), dated Dec. 3, 2021 (not translated).

Russia Patent Office Decision to Grant in Russia Application No. 2019124328/07(047555), dated Dec. 3, 2021 (not translated).

CN Office Action dated Nov. 2, 2022 in CN Application No. 201980001214.1, not translated.

\* cited by examiner

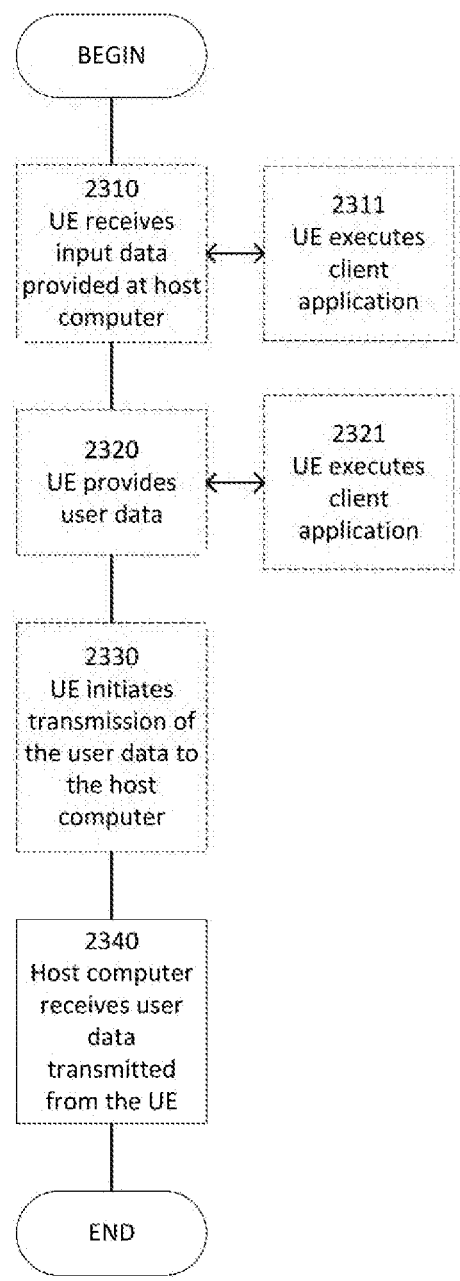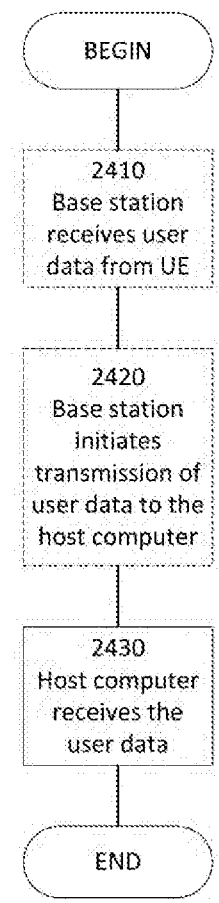
FIG. 23
FIG. 24

QOS FLOW CONTROL PARAMETERS SIGNALING

PRIORITY

This nonprovisional application is a U.S. National Stage Filing under 35 U.S.C. § 371 of International Patent Application Serial No. PCT/CN2019/084134 filed Apr. 24, 2019 and entitled "QOS FLOW CONTROL PARAMETERS SIGNALING" which claims priority to International Patent Application Serial No. PCT/CN2018/085165 filed Apr. 28, 2018 both of which are hereby incorporated by reference in their entirety.

TECHNICAL FIELD

The present disclosure generally relates to the technical field of telecommunication, and particularly to methods, Network Function (NF) entities, and User Equipments (UEs) for signaling Quality of Service (QoS) Flow control parameters and corresponding readable media.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

In $5^{th}$ Generation (5G) networks, a Network Slice is introduced as a logical network that provides specific network capabilities and network characteristics. An instance of a network slice (e.g., a network slice instance (NSI)) is a set of Network Function (NF) instances and the required resources (e.g., compute, storage, and networking resources) which form a deployed Network Slice. A NF is a 3GPP adopted or 3GPP defined processing function in a network, which has defined functional behavior and 3GPP defined interfaces. An NF can be implemented either as a network element on dedicated hardware, a software instance running on a dedicated hardware, or as a virtualized functional instantiated on an appropriate platform, e.g., on a cloud infrastructure.

3GPP 5GS also defines a Quality of Service (QoS) Flow. A QoS Flow is the finest granularity for QoS forwarding treatment in the 5G System. All traffic mapped to the same 5G QoS Flow receives the same forwarding treatment (e.g., scheduling policy, queue management policy, rate shaping policy, RLC configuration, etc.). Providing different QoS forwarding treatment requires separate 5G QoS Flow.

SUMMARY

The present application relates to how to signal QoS Flow control parameters in a 5G or future developed system.

According to a first aspect of the present disclosure, a method at a network node for signaling Quality of Service (QoS) Flow control parameters to a User Equipment, UE, is provided. The method comprises generating one or more data flow rules associated with a QoS Flow, wherein each of the one or more data flow rules comprises parameters specific to a data flow that belongs to the QoS Flow. The method further comprises generating a QoS Flow profile to the UE for the QoS Flow, wherein the QoS Flow profile comprises parameters that are common to all data flows that belong to the same QoS Flow. The method also comprises transmitting the one or more data flow rules and the QoS Flow profile to the UE.

In an exemplary embodiment, each of the one or more data flow rules is represented by an identifier that is differentiated from each other which is transmitted to the UE.

In an exemplary embodiment, each of the one or more data flow rules comprises parameters that are related to one or more Service Data Flow (SDF) templates and/or one or more associated precedence values.

In an exemplary embodiment, each of the one or more data flow rules and the QoS Flow profile comprises an identifier of the QoS Flow.

In an exemplary embodiment, the method may further comprise transmitting the one or more data flow rules to the UE, to inform the UE to add the one or more data flow rules for the QoS flow.

In an exemplary embodiment, the method may further comprise transmitting a parameter to the UE if the parameter in the QoS Flow profile changes from that one in the previous QoS Flow profile, to enable the UE to update the parameter in the QoS Flow profile for the QoS Flow.

In an exemplary embodiment, the method may further comprise transmitting an identifier of a data flow rule to the UE, to inform the UE to delete the data flow rule identified by the identifier.

In an exemplary embodiment, the method may further comprise transmitting an identifier of the QoS Flow to the UE if a data flow rule to be removed is the last one of the QoS Flow, to inform the UE to delete the QoS Flow profile for the QoS Flow and the last data flow rule.

According to a second aspect of the present disclosure, a method for at a User Equipment (UE) for receiving parameter is provided. The method comprises receiving one or more data flow rules associated with a Quality of Service (QoS) Flow, wherein each of the one or more data flow rules comprises parameters specific to a data flow that belongs to that QoS Flow. The method further comprises receiving a QoS Flow profile for the QoS Flow, wherein the QoS Flow profile comprises parameters that are common to all data flows that belong to the same QoS Flow.

In an exemplary embodiment, the method may further comprise receiving an identifier of a data flow rule, and deleting the data flow rule.

In an exemplary embodiment, the method may further comprise receiving a data flow rule only.

In an exemplary embodiment, the method may further comprise receiving an identifier of a QoS Flow, and deleting the data flow rule and the QoS Flow profile associated with the QoS Flow.

In an exemplary embodiment, the method may further comprise receiving a parameter, and updating the parameter in the QoS Flow profile with the received parameter.

According to a third aspect of the present disclosure, a method at a network node for signaling a Quality of Service (QoS) rule to a User Equipment (UE) is provided.

The method comprises generating a QoS rule associated with a QoS Flow, wherein the QoS rule comprises parameters common to all data flows that belong to the same QoS Flow, and one or more parameter sets, wherein each of the one or more parameter sets comprises parameters that are specific to a data flow that belongs to the QoS Flow. The method then comprises transmitting the QoS rule to the UE.

In an exemplary embodiment, each of the one or more parameter sets is differentiated from each other by an identifier which is included in the one or more parameter sets.

In an exemplary embodiment, each of the one or more parameter sets comprises parameters that are related to one or more Service Data Flow (SDF) templates and/or one or more associated precedence values.

In an exemplary embodiment, the method may further comprise transmitting the parameter set along with an identifier of the QoS rule to the UE if the QoS rule has already been transmitted, to enable the UE to update the QoS rule to include the parameter set.

In an exemplary embodiment, the method may further comprise transmitting one or more of the common parameters along with an identifier of the QoS rule to the UE, to enable the UE to update corresponding parameter in the QoS rule with the received one or more parameters.

In an exemplary embodiment, the method may further comprise transmitting an identifier of the parameter set along with an identifier of the QoS rule to the UE, to enable the UE to update the QoS rule by deleting the parameter set from the QoS rule.

In an exemplary embodiment, the method may further comprise transmitting an identifier of the QoS Flow to the UE if a parameter set to be removed is the last one of the QoS rule, to inform the UE to delete the QoS rule for the QoS Flow.

In an exemplary embodiment, the method may further comprise transmitting a parameter and an identifier of a parameter set to which the parameter belongs along with an identifier of the QoS rule to the UE, to enable the UE to update the QoS rule by updating the parameter in the parameter set.

According to a fourth aspect of the present disclosure, a method at a User Equipment (UE) for receiving a Quality of Service (QoS) rule is provided. The method comprises receiving a QoS rule associated with a QoS Flow, wherein the QoS rule comprises parameters common to all data flows that belong to the same QoS Flow, and one or more parameter sets, wherein each of the one or more parameter sets comprises parameters that are specific to a data flow that belongs to the QoS Flow.

In an exemplary embodiment, the method may further comprise receiving the parameter set along with an identifier of the QoS rule, and updating the QoS rule to include the parameter set.

In an exemplary embodiment, the method may further comprise receiving an identifier of the parameter set along with an identifier of the QoS rule, and updating the QoS rule by deleting the parameter set from the QoS rule.

In an exemplary embodiment, the method may further comprise receiving one or more of the common parameters along with an identifier of the QoS rule, and updating the corresponding parameter in the QoS rule with the received one.

In an exemplary embodiment, the method may further comprise receiving a parameter and an identifier of a parameter set to which the parameter belongs along with an identifier of the QoS rule, and updating the QoS rule by updating the parameter in the parameter set.

According to a fifth aspect of the present disclosure, an NF entity is provided, comprising: at least one processor, and a memory comprising instructions which, when executed by the at least one processor, cause the NF entity to operate according to the first and third aspect of the present disclosure.

According to a sixth aspect of the present disclosure, a UE is provided, comprising: at least one processor, and a memory comprising instructions which, when executed by the at least one processor, cause the UE to operate according to the second and fourth aspect of the present disclosure.

According to a seventh aspect of the present disclosure, an NF entity is provided, comprising: a generating module configured for generating one or more data flow rules associated with a QoS Flow, wherein each of the one or more data flow rules comprises parameters specific to a data flow that belongs to the QoS Flow, and the generating module further configured for generating a QoS Flow profile to the UE for the QoS Flow, wherein the QoS Flow profile comprises parameters that are common to all data flows that belong to the same QoS Flow; and a transmitting module configured for transmitting the one or more data flow rules and the QoS Flow profile to the UE.

According to an eighth aspect of the present disclosure, a UE is provided, comprising: a receiving module configured for receiving one or more data flow rules associated with a Quality of Service (QoS) Flow, wherein each of the one or more data flow rules comprises parameters specific to a data flow that belongs to that QoS Flow; and the receiving module further configured for receiving a QoS Flow profile for the QoS Flow, wherein the QoS Flow profile comprises parameters that are common to all data flows that belong to the same QoS Flow.

According to a ninth aspect of the present disclosure, an NF entity is provided, comprising: a generating module configured for generating a QoS rule associated with a QoS Flow, wherein the QoS rule comprises parameters common to all data flows that belong to the same QoS Flow, and one or more parameter sets, wherein each of the one or more parameter sets comprises parameters that are specific to a data flow that belongs to the QoS Flow; and a transmitting module configured for transmitting the QoS rule to the UE.

According to a tenth aspect of the present disclosure, a UE is provided, comprising: a receiving module configured for receiving a QoS rule associated with a QoS Flow, wherein the QoS rule comprises parameters common to all data flows that belong to the same QoS Flow, and one or more parameter sets, wherein each of the one or more parameter sets comprises parameters that are specific to a data flow that belongs to the QoS Flow.

According to another aspect of the present disclosure, a computer readable medium which stores computer program comprising instructions which, when executed on at least one processor of a device, cause the device to perform the methods according to the first, second, third and fourth aspects as discussed previously.

According to the above technical solutions of the present disclosure, common parameters will be transmitted only once, thereby the signaling efficiency is improved.

BRIEF DESCRIPTION OF THE DRAWINGS

The objects, advantages and characteristics of the present disclosure will be more apparent, according to descriptions of preferred embodiments in connection with the drawings, in which:

FIGS. 21 to 24 are flowcharts illustrating methods implemented in a communication system including a host computer, a base station and a user equipment.

Figure 1:
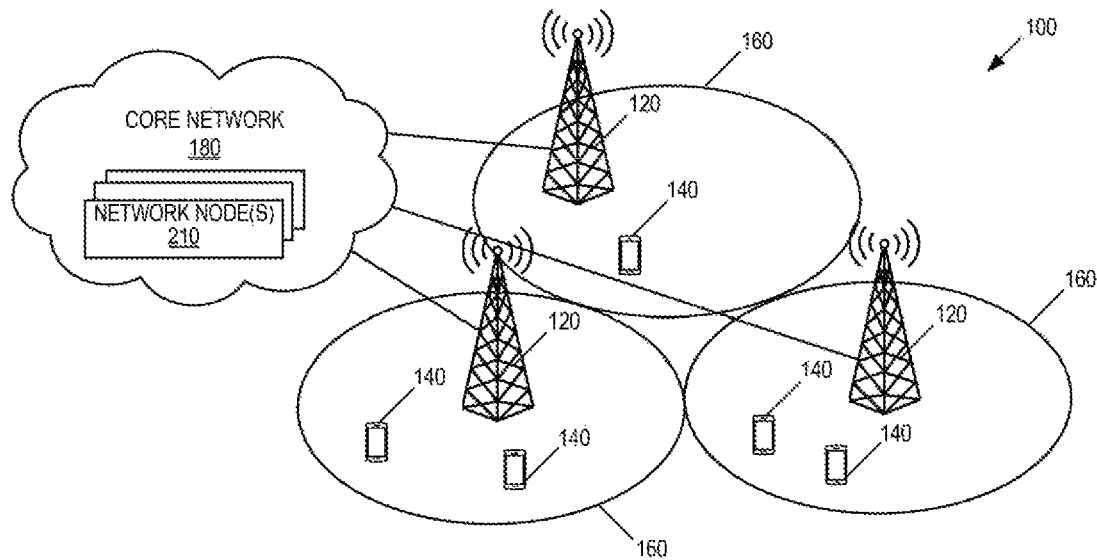
FIG. 1 illustrates one example of a wireless communication system in which embodiments of the present disclosure may be implemented.

It should be noted that throughout the drawings, same or similar reference numbers are used for indicating same or similar elements; various parts in the drawings are not drawn to scale, but only for an illustrative purpose, and thus should not be understood as any limitations and constraints on the scope of the present disclosure.

DETAILED DESCRIPTION

Hereinafter, the principle and spirit of the present disclosure will be described with reference to illustrative embodiments. Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

References in this specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of the skilled in the art to affect such feature, structure, or characteristic in connection with other embodiments whether or not explicitly described.

The terminology used herein is for the purpose of describing particular embodiments only and is not intended to be liming of exemplary embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

The techniques described herein may be used for various wireless communication networks such as Code Division Multiple Access (CDMA), Time Division Multiple Access (TDMA), Frequency Division Multiple Access (FDMA), Orthogonal Frequency Division Multiple Access (OFDMA), Single Carrier-Frequency Division Multiple Access (SC-FDMA), Long Term Evolution (LTE) and other networks developed in the future. The terms "network" and "system" are often used interchangeably. For illustration only, certain aspects of the techniques are described below for the next, i.e., the 5$^{th}$ generation of wireless communication network. However, it will be appreciated by the skilled in the art that the techniques described herein may also be used for other wireless networks such as LTE and corresponding radio technologies mentioned herein as well as wireless networks and radio technologies proposed in the future.

As used herein, the term "UE" may be, by way of example and not limitation, a User Equipment (UE), a SS (Subscriber Station), a Portable Subscriber Station (PSS), a Mobile Station (MS), a Mobile Terminal (MT) or an Access Terminal (AT). The UE may include, but not limited to, mobile phones, cellular phones, smart phones, or personal digital assistants (PDAs), portable computers, image capture terminal devices such as digital cameras, gaming terminal devices, music storage and playback appliances, wearable terminal devices, vehicle-mounted wireless terminal devices and the like. In the following description, the terms "UE", "terminal device", "mobile terminal" and "user equipment" may be used interchangeably.

FIG. 1 illustrates one example of a wireless communication system 100 in which embodiments of the present disclosure may be implemented. The wireless communication system 100 may be a cellular communications system such as, for example, a 5G New Radio (NR) network or an LTE cellular communications system. As illustrated, in this example, the wireless communication system 100 includes a plurality of radio access nodes 120 (e.g., evolved Node Bs (eNBs), 5G base stations which are referred to as gNBs, or other base stations or similar) and a plurality of wireless communication devices 140 (e.g., conventional UEs, Machine Type Communication (MTC)/Machine-to-Machine (M2M) UEs). The wireless communication system 100 is organized into cells 160, which are connected to a core network 180 via corresponding radio access nodes 120. The radio access nodes 120 are capable of communicating with the wireless communication devices 140 (also referred to herein as wireless communication device 140 or UEs 140) along with any additional elements suitable to support communication between wireless communication devices or between a wireless communication device and another communication device (such as a landline telephone). The core network 180 includes one or more network nodes or functions 210. In some embodiments, the network nodes/functions 210 may comprise, for example, any of the network functions shown in FIGS. 2 and 3.

Figure 2:
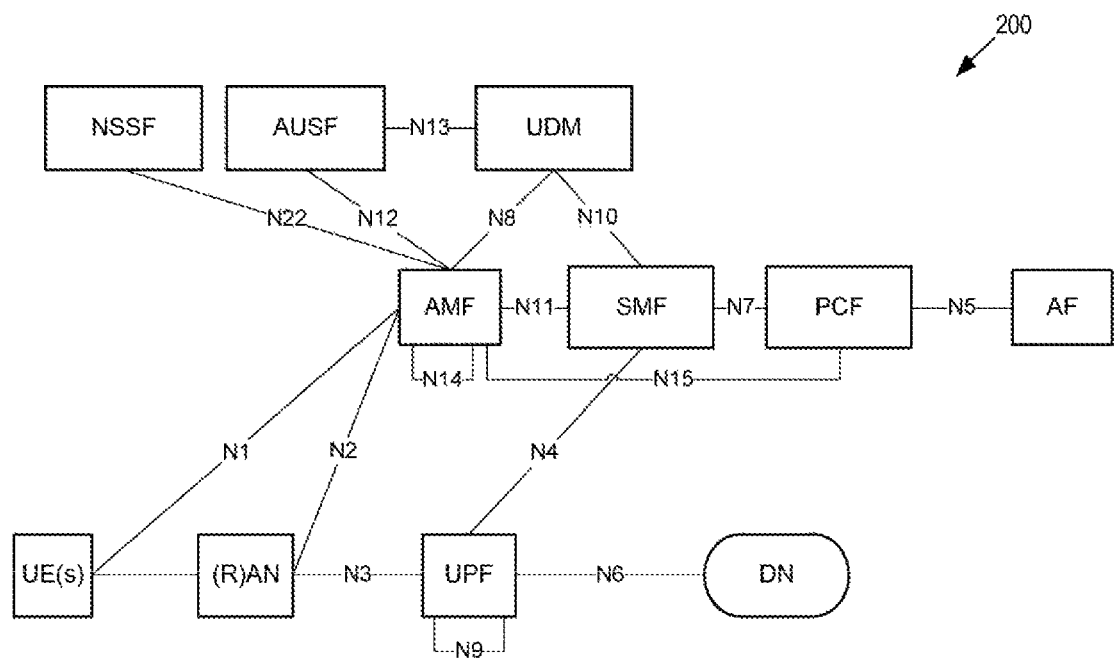
FIG. 2 illustrates a wireless communication system represented as a 5G network architecture composed of core NFs.

FIG. 2 illustrates a wireless communication system 200 represented as a 5G network architecture composed of core NFs, where interaction between any two NFs is represented by a point-to-point reference point/interface.

Seen from the access side the 5G network architecture shown in FIG. 2 comprises a plurality of User Equipment (UEs) connected to either a Radio Access Network (RAN) or an Access Network (AN) as well as an Access and Mobility Management Function (AMF). Typically, the RAN or AN comprises base stations, e.g., such as evolved Node Bs (eNBs) or 5G base stations (gNBs) or the similar. Seen from the core network side, the 5G core NFs shown in FIG. 2 include a Network Slice Selection Function (NSSF), an Authentication Server Function (AUSF), a Unified Data Management (UDM), an Access and Mobility Management Function (AMF), a Session Management Function (SMF), a Policy Control Function (PCF), an Application Function (AF).

Reference point representations of the 5G network architecture are used to develop detailed call flows in the normative standardization. The N1 reference point is defined to carry signaling between UE and AMF. The reference points for connecting between AN and AMF and between AN and UPF are defined as N2 and N3, respectively. There is a reference point, N11, between AMF and SMF, which implies that SMF is at least partly controlled by AMF. N4 is used by SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since PCF applies policy to AMF and SMP, respectively. N12 is required for the AMF to perform authentication of the UE. N8 and N10 are defined because the subscription data of UE is required for AMF and SMF.

The 5G core network aims at separating user plane and control plane. The user plane carries user traffic while the control plane carries signaling in the network. In FIG. 2, the UPF is in the user plane and all other NFs, i.e., AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like PCF and AUSF can be separated as shown in FIG. 2. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 3:
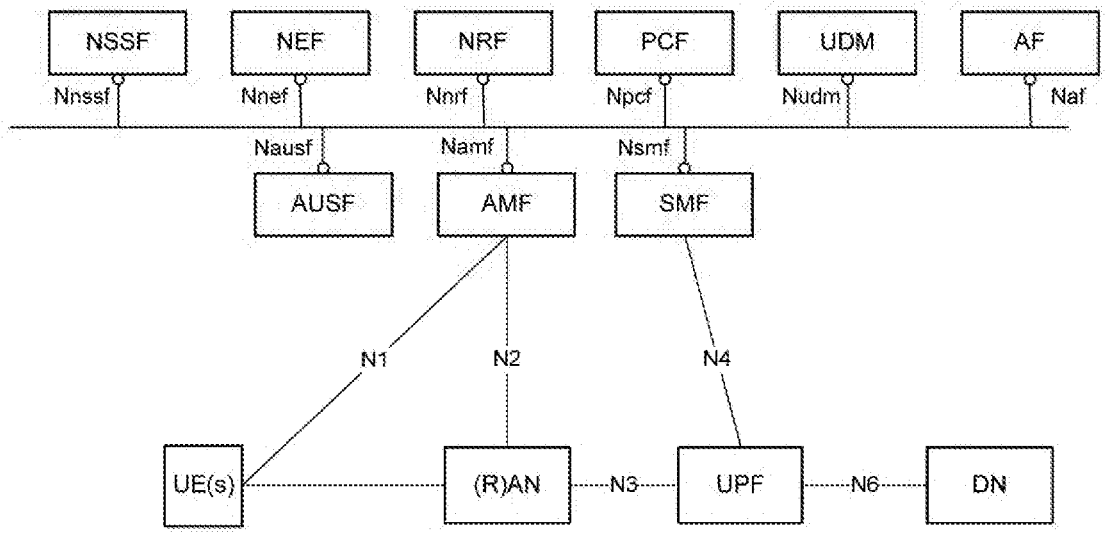
FIG. 3 illustrates a 5G network architecture using service-based interfaces between the NFs in the control plane, instead of the point-to-point reference points/interfaces used in the 5G network architecture of FIG. 2.

FIG. 3 illustrates a 5G network architecture using service-based interfaces between the NFs in the control plane, instead of the point-to-point reference points/interfaces used in the 5G network architecture of FIG. 2. However, the NFs described above with reference to FIG. 2 correspond to the NFs shown in FIG. 3. The services etc. that a NF provides to other authorized NFs can be exposed to the authorized NFs through the service-based interface. In FIG. 3, the service based interfaces are indicated by the letter "N" followed by the name of the NF, e.g., Namf for the service based interface of the AMF, Nsmf for the service based interface of the SMF, and so on. The Network Exposure Function (NEF) and the Network Function Repository Function (NRF) in FIG. 3 are not shown in FIG. 2. However, it should be clarified that all NFs depicted in FIG. 2 can interact with the NEF and the NRF of FIG. 3 as necessary, though not explicitly indicated in FIG. 2.

Some properties of the NFs shown in FIGS. 2 and 3 may be described in the following manner. The AMF provides UE-based authentication, authorization, mobility management, etc. A UE even using multiple access technologies is basically connected to a single AMF because the AMF is independent of the access technologies. The SMF is responsible for session management and allocates IP addresses to UEs. It also selects and controls the UPF for data transfer. If a UE has multiple sessions, different SMFs may be allocated to each session to manage them individually and possibly provide different functionalities per session. The AF provides information on the packet flow to PCF responsible for policy control in order to support Quality of Service (QoS). Based on the information, PCF determines policies about mobility and session management to make AMF and SMF operate properly. The AUSF supports authentication function for UEs or similar and thus stores data for authentication of UEs or similar while UDM stores subscription data of UE. The Data Network (DN), not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Hereinafter, a method for signaling QoS Flow control parameters according to an exemplary embodiment of the present disclosure will be described with reference to FIGS. 4 and 5.

In the present disclosure, a QoS rule can be generated based on a Policy and Charging Control (PCC) rule, and the precedence value of a QoS rule is set to the precedence value of the PCC rule; and parameters such as 5QI and Averaging Window which are included in a QoS rule, together with a few other parameters, are bound to a QoS Flow.

Figure 4:
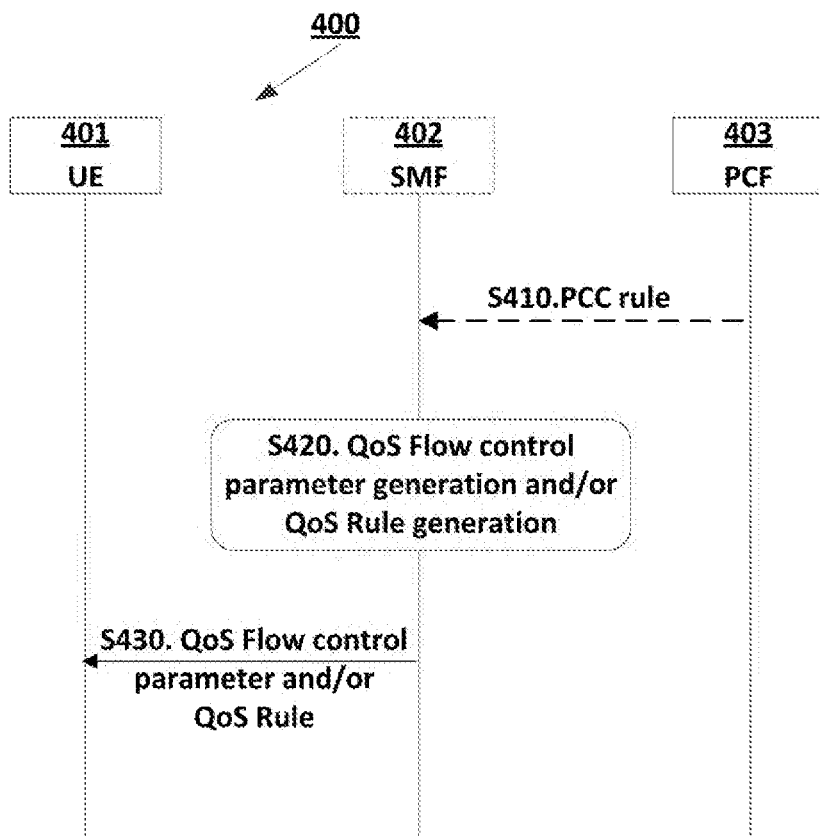
FIG. 4 shows an exemplifying signaling diagram illustrating details of a method for signaling QoS Flow control parameters and/or a QoS rule.

FIG. 4 shows an exemplifying signaling diagram illustrating details of a method 400 for signaling QoS Flow control parameters and/or a QoS rule.

As shown in FIG. 4, the method 400 may include steps S410-S430.

In Step S410, PCF 403 may provide a PCC rule to SMF 402. This step is optional. A PCC rule may be provisioned in SMF 402 by default.

SMF 402 then derives QoS Flow control parameters and/or a QoS rule in step S420, and transmits QoS Flow control parameters and/or a QoS rule to UE 401 in step S430.

When multiple QoS rules with the same QoS Flow Identifier (QFI) are generated from multiple PCC rules, and/or when multiple QoS rules for the same QoS Flow are generated from multiple PCC rules, some of the parameters are repeated in different QoS rules. When the number of QoS rules for the same QFI is increased, the repetition times of some parameters are also increased. The more the repeated times, the more degraded the signaling efficiency.

Below is an example of x QoS rules with the same QFI value:

QoS Rule 1

| | |
|---|---|
| QoS Rule Identifier 1 | |
| QFI1 | |
| Packet filter1 | |
| Precedence1 | |
| Averaging Window | (if GBR) |
| GFBR UL | (if GBR) |
| GFRB DL | (if GBR) |
| MFBR UL | (if GBR) |
| MFRB DL | (if GBR) |
| 5QI | (if not the same as QFI) |
| EBI | (if EPS IWK is required) |
| Mapped QoS parameters | (if EPS IWK is required) |
| Mapped extended EPS QoS parameters | (if EPS IWK is required) |
| Mapped traffic flow template | (if EPS IWK is required) |

QoS Rule 2

| | |
|---|---|
| QoS Rule Identifier 2 | |
| QFI1 | |
| Packet filter2 | |
| Precedence2 | |
| Averaging Window | (repeating) |
| GFBR UL | (repeating) |
| GFRB DL | (repeating) |
| MFBR UL | (repeating) |
| MFRB DL | (repeating) |
| 5QI (if not the same as QFI) | (repeating) |
| EBI | (repeating) |
| Mapped QoS parameters | (repeating) |
| Mapped extended EPS QoS parameters | (repeating) |
| Mapped traffic flow template | (repeating) |

QoS Rule x

| | |
|---|---|
| QoS Rule Identifier x | |
| QFI1 | |
| Packet filter x | |
| Precedence x | |
| Averaging Window | (repeating) |
| GFBR UL | (repeating) |
| GFRB DL | (repeating) |
| MFBR UL | (repeating) |
| MFRB DL | (repeating) |
| 5QI (if not the same as QFI) | (repeating) |
| EBI | (repeating) |
| Mapped QoS parameters | (repeating) |
| Mapped extended EPS QoS parameters | (repeating) |
| Mapped traffic flow template | (repeating) |

Figure 5:
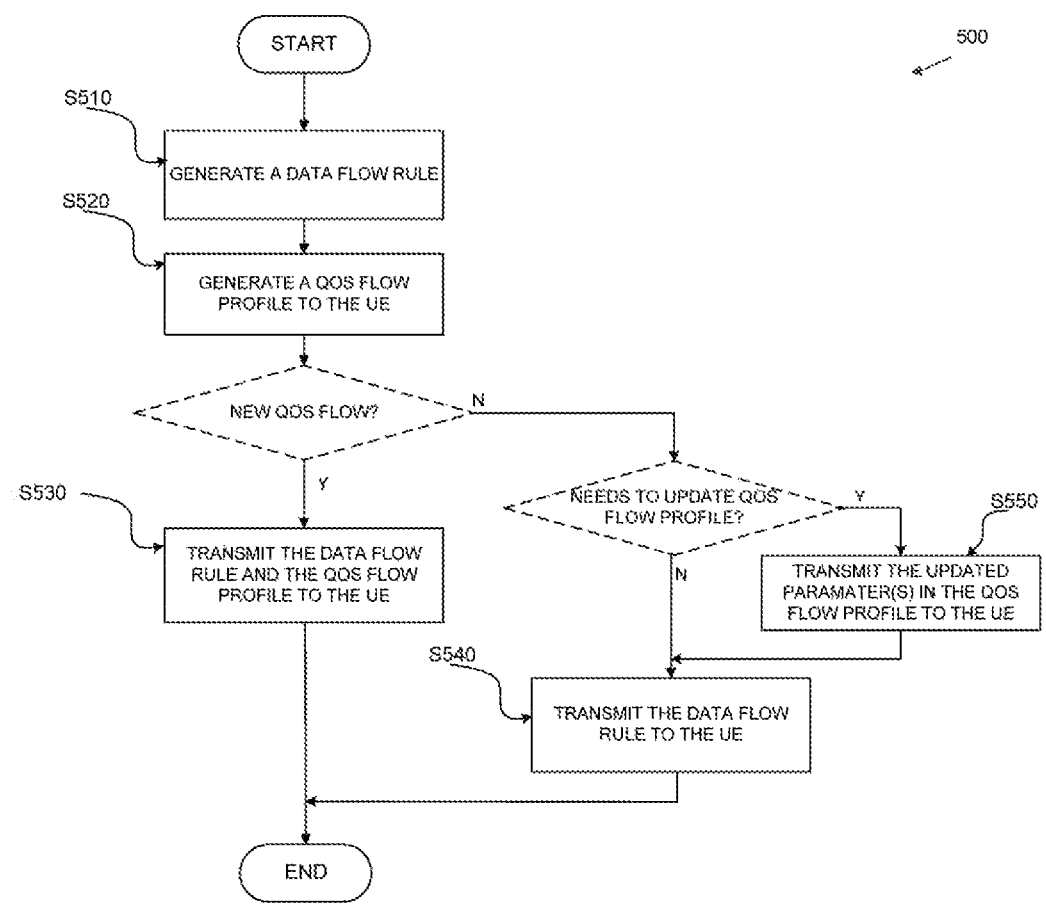
FIG. 5 illustratively shows a flowchart of a method for signaling parameters to a UE according to an exemplary embodiment of the present disclosure.

FIG. 5 illustratively shows a flowchart of a method 500 for signaling parameters to a UE according to an exemplary embodiment of the present disclosure. In an embodiment, the method 500 may be performed at a Network Function (NF) entity, such as a SMF.

As shown in FIG. 5, the method 500 may include Steps S510-S530.

In Step S510, one or more data flow rules associated with a QoS Flow can be generated. Each of the one or more data flow rule rules comprises parameters specific to a data flow that belongs to the QoS Flow.

In Step S520, a QoS Flow profile to the UE for the QoS Flow can be generated. The QoS Flow profile comprises parameters that are common to all data flows that belong to the same QoS Flow.

Then in step S530, the one or more data flow rules and the QoS Flow profile can be transmitted to the UE.

It is realized that when multiple QoS rules for the same QFI are generated from multiple PCC rules, some of the parameters are repeated in different QoS rules. In the present application, parameters in a QoS rule that are common to a QoS flow are included in a QoS flow profile, while parameters in a QoS rule that are specific to a data flow (such as, a SDF) that belongs to the QoS Flow are included in a data flow rule. The QoS flow profile and the data flow rule may be linked by any indication, such as an identifier of the QoS flow. By transmitting a QoS flow profile and the data flow rule separately to the UE, the signaling efficiency may be improved. For example, if there are two, three or more QoS rules for the same QoS flow that are generated from two, three or more PCC rules, a QoS flow profile and two, three or more data flow rules may be transmitted, where the parameters in the two, three or more QoS rules that are common are included in the QoS flow profile, while other parameters in a QoS rule than the common parameters are included in a respective data flow rule. The common parameters will be transmitted only once, thereby the signaling efficiency is improved.

Below is an example of the QoS Flow profile and 3 data flow rules in the case of 3 data flows that belong to the same QFI value described above:

Data Flow Rule 1
    Data Flow Rule Identifier1
    Packet filter1
    Precedence1
Data Flow Rule 2
    Data Flow Rule Identifier2
    Packet filter2
    Precedence2
Data Flow Rule 3
    Data Flow Rule Identifier3
    Packet filter3
    Precedence3
QoS Flow Profile

| | |
|---|---|
| Averaging Window | (if GBR) |
| GFBR UL | (if GBR) |
| GFRB DL | (if GBR) |
| MFBR UL | (if GBR) |
| MFRB DL | (if GBR) |
| 5QI | (if not the same as QFI) |
| EBI | (if EPS IWK is required) |
| Mapped QoS parameters | (if EPS IWK is required) |
| Mapped extended EPS QoS parameters | (if EPS IWK is required) |
| Mapped traffic flow template | (if EPS IWK is required) |

The Data Flow rule and the QoS Flow profile may be transmitted in different or same information elements.

In an embodiment, each of the one or more data flow rules is represented by an identifier that is differentiated from each other which is transmitted to the UE. The identifier is shown as a data flow rule identifier in the above example.

In an embodiment, each of the one or more data flow rules comprises parameters that are related to one or more SDF templates and/or one or more associated precedence values. For example, in the above example, each data flow rule comprises one or more Packet filters and/or one or more precedence values.

In an embodiment, each of the one or more data flow rules and the QoS Flow profile to the UE comprises an identifier of the QoS Flow. For example, the identifier of the QoS Flow may be a QoS Flow Identifier (QFI).

As shown in FIG. 5, the method 500 may further comprise Step S540 of transmitting the one or more data flow rules to the UE, to inform the UE to add the one or more data flow rules for the QoS flow. For example, if a new PCC rule is provided and it is bound to the same QoS Flow, a new QoS rule may be generated from the new PCC rule. A new data flow rule is generated by the parameters that are specific to a service data flow (controlled by the PCC rule) in the new QoS rule. If parameters in the new QoS rule that are common to those in the QoS Flow profile do not change, only the new data flow rule is transmitted in step S540. In another embodiment, if any parameter in the new QoS rule that are common to those in the QoS Flow profile changes, i.e., any parameter changes from that one in the previous QoS Flow profile, the changed parameter is also transmitted to the UE in step S550, to enable the UE to update the common parameters for the QoS Flow.

Figure 6:
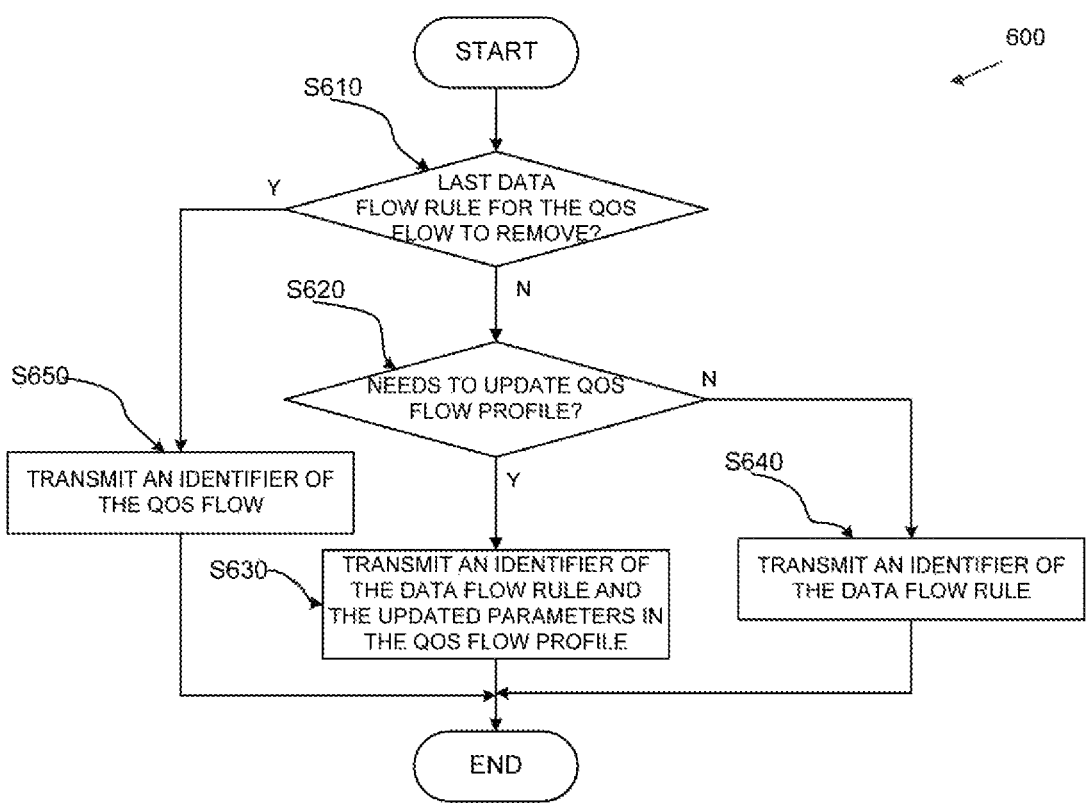
FIG. 6 illustratively shows a flowchart of a method for deleting a data flow rule according to an exemplary embodiment of the present disclosure.

FIG. 6 illustratively shows a flowchart of a method 600 for deleting a data flow rule according to an exemplary embodiment of the present disclosure. In an embodiment, the method 600 may be performed at a Network Function (NE) entity, such as a SMF.

For example, when a PCC rule is removed, then a data flow rule that comprises parameters specific to the service data flow (controlled by the PCC rule) shall be removed. As shown in FIG. 6, the method 600 may further comprise step S610 of determining whether the data flow rule to be removed is the last one of the QoS Flow. If it is not the last one, it is determined whether it needs to update the QoS Flow profile in step S620. If any parameter in the QoS Flow profile changes, the changed parameter and an identifier of the data flow rule are transmitted in step S630. If there is no need to update the QoS Flow profile, only the identifier of the data flow rule is transmitted in step S640. If the data flow rule to be removed is the last one of the QoS Flow, an identifier of the QoS Flow is transmitted in step S650. For example, when a data flow is removed, parameters associated with the data flow shall be removed, including the data flow rule and the QoS Flow profile. Alternatively, an identifier of the QoS Flow and an identifier of the data flow rule are transmitted in S650, to inform the UE to remove all parameters associated with the data flow, including the data flow rule and the QoS Flow profile.

Figure 7:
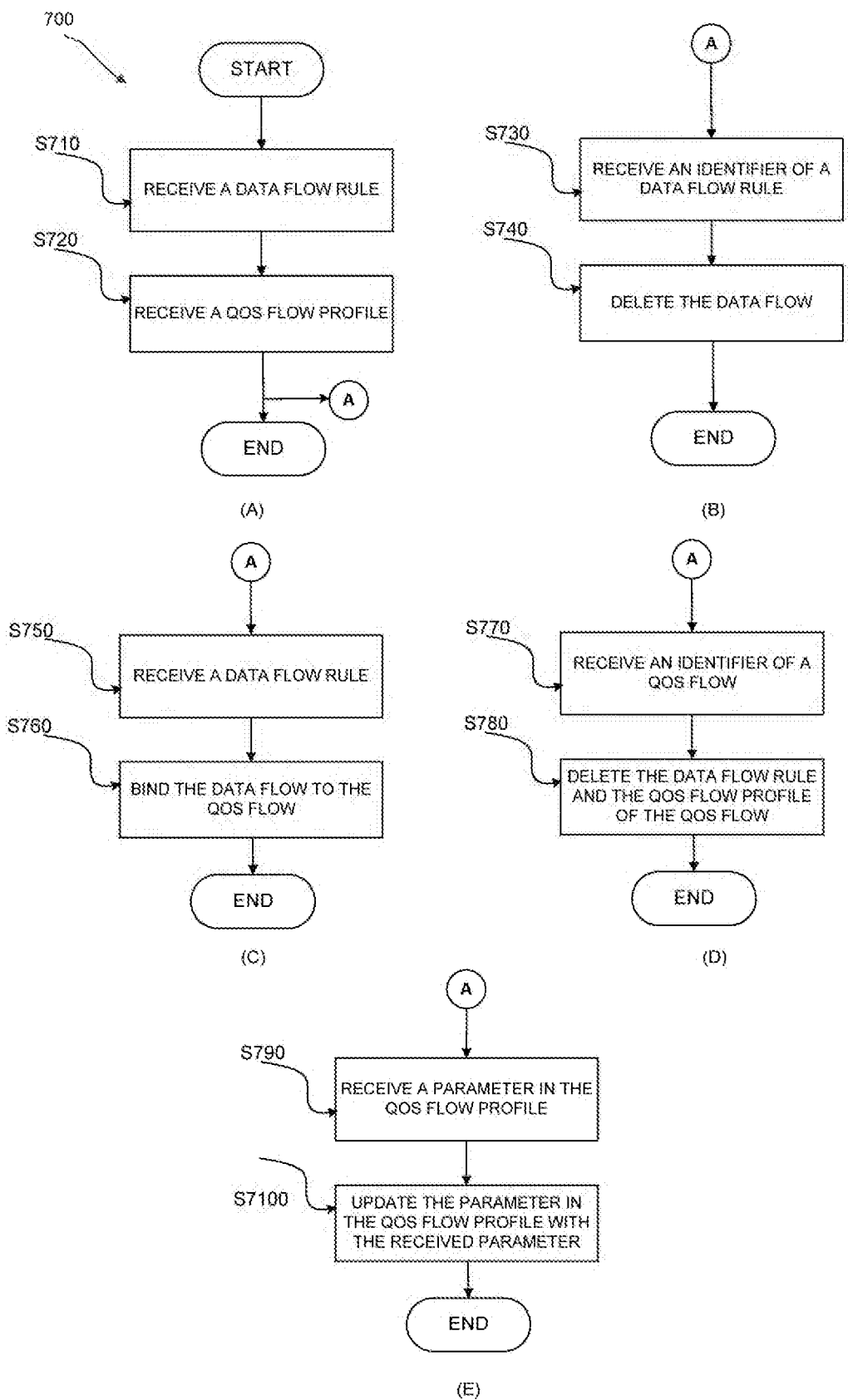
FIG. 7 illustratively shows a flowchart of a method for receiving parameters according to an exemplary embodiment of the present disclosure.

FIG. 7 illustratively shows a flowchart of a method 700 for receiving parameters according to an exemplary embodiment of the present disclosure. In an embodiment, the method 700 may be performed at a UE.

As shown in FIG. 7, the method 700 may include Step S710 of receiving one or more data flow rules associated with a QoS Flow. Each of the one or more data flow rules comprises parameters specific to a data flow that belongs to that QoS Flow. The method 700 may further include Step S720 of receiving a QoS Flow profile for the QoS Flow. The QoS Flow profile comprises parameters that are common to all data flows that belong to the same QoS Flow.

In an embodiment, each of the one or more data flow rules is represented by an identifier that is differentiated from each other which is also received. In the above example, the identifier is a data flow rule identifier.

In an embodiment, each of the one or more data flow rules and the QoS Flow profile comprises an identifier of the QoS Flow. For example, the identifier of the QoS Flow may be a QoS Flow Identifier (QFI).

In an embodiment, as shown in FIG. 7, the method may include Step S730 of receiving an identifier of a data flow rule. When an identifier of a data flow rule is received, it is informed that the data flow rule shall be deleted. The method thus may include step S740 of deleting the data flow rule.

In an embodiment, as shown in FIG. 7, the method may include step S750 of receiving a data flow rule. A data flow rule that is received independently means that it is a new data flow rule for the QoS Flow. By an identifier included in the data flow rule that identifies the QoS Flow, the receiving entity (e.g., the UE) may for example, bind the received data flow rule to the QoS Flow, and thereby to the QoS Flow profile of the QoS Flow.

In an embodiment, as shown in FIG. 7, the method may include step S770 of receiving an identifier of a QoS Flow to be removed. When an identifier of a QoS Flow to be removed is received, it is informed that all parameters associated with the QoS Flow shall be deleted. The method thus further comprises Step S780 of deleting the data flow rule and the QoS Flow profile associated with the QoS Flow.

In an embodiment, as shown in FIG. 7, the method may include step S790 of receiving a parameter. When a parameter is received, it is informed that the parameter in the QoS Flow profile shall be updated. The method thus further comprises Step S7100 of updating the parameter in the QoS Flow profile with the received parameter.

The steps may be performed in any combination. For example, if an identifier of a data flow rule is received (e.g., as in step S730) and a parameter is received (e.g., as in Step S790), the data flow rule is deleted and the parameter in the QoS Flow profile is updated with the received parameter. As another example, if a data flow rule to be added is received (e.g., as in step S750) and a parameter is received (e.g., as in Step S790), the data flow rule is linked to the QoS Flow and the parameter in the QoS Flow profile is updated with the received parameter.

It shall be understood that the terms used herein such as "Data Flow rule", "QoS Flow profile" are just examples. Other appropriate designations may also be applicable. For example, in the future developed standard, the Data Flow rule may still be named as "QoS rule" to maintain the conventional QoS rule, or the "QoS Flow profile" may be named in another way, such as "FLOW profile" as an example.

Figure 8:
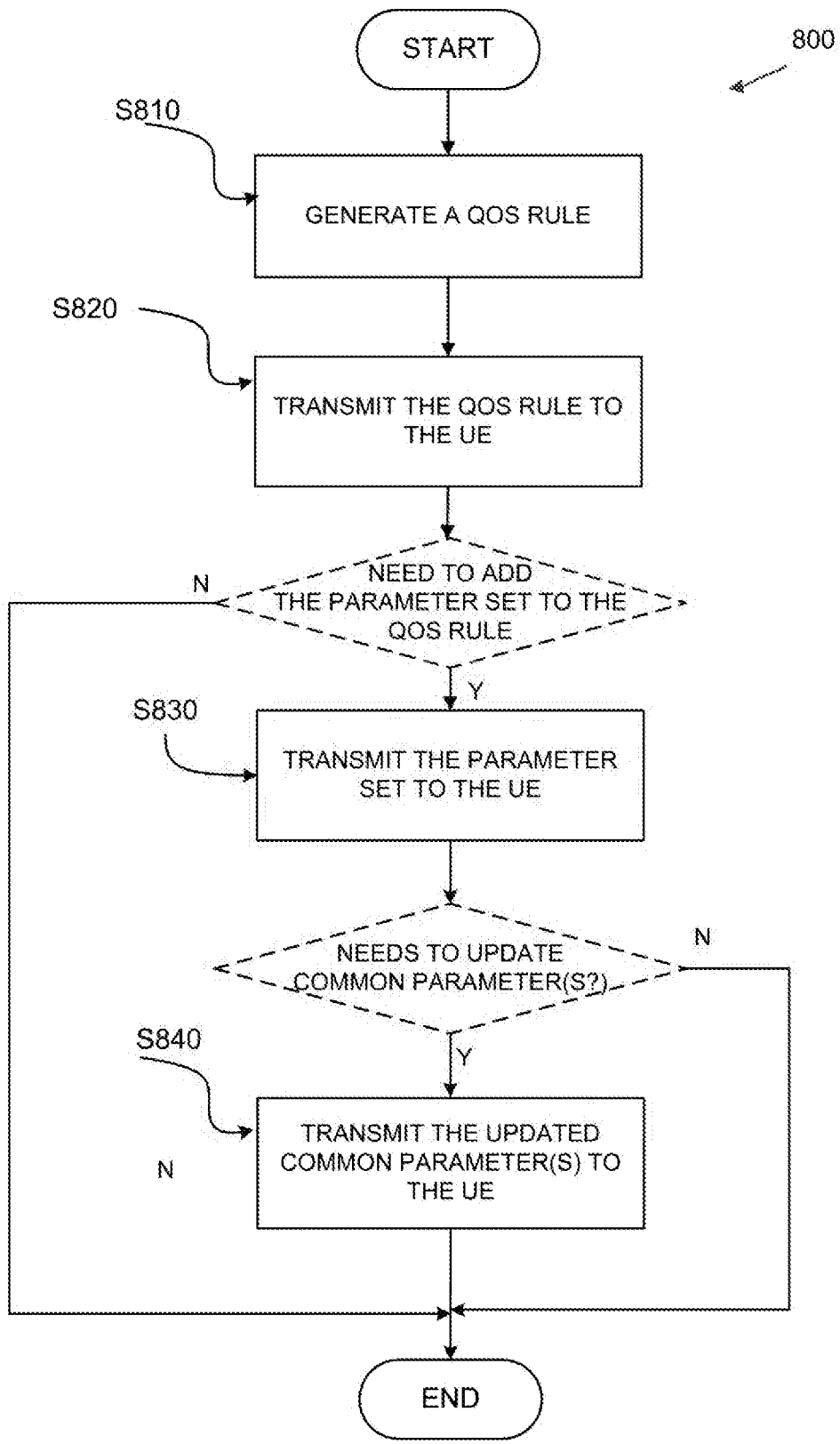
FIG. 8 illustratively shows a flowchart of a method for signaling a QoS rule to a UE according to an exemplary embodiment of the present disclosure.

FIG. 8 illustratively shows a flowchart of a method 800 for signaling a QoS rule to a UE according to an exemplary embodiment of the present disclosure. In an embodiment, the method 800 may be performed at a Network Function (NF) entity, such as a SMF.

As shown in FIG. 8, the method 800 may include Steps S810 and S820.

In Step S810, a QoS rule associated with a QoS Flow can be generated. The QoS rule comprises parameters common to all SDFs that belong to the same QoS Flow, and one or more parameter sets, wherein each of the one or more parameter sets comprises parameters that are specific to a SDF that belong to the QoS Flow.

In Step S820, the generated QoS rule can be transmitted to the UE.

It is realized that when multiple QoS rules for the same QFI are generated from multiple PCC rules, some of the parameters are repeated in different QoS rules. In the present application, a new (modified) QoS rule is proposed. Parameters that are common to a QoS Flow are included in a QoS rule once, while parameters that are specific to a data flow (such as, a SDF) that belongs to the QoS Flow are included in a parameter set. By transmitting a QoS rule that comprises the common parameters and one or more parameter sets to the UE, the signalling efficiency may be improved. For example, if there are two, three or more legacy QoS rules for the same QoS flow that are generated from two, three or more PCC rules, a (new/modified) QoS rule may be transmitted, where the parameters that are common are included in the QoS rule once, while other parameters than the common parameters are included in respective parameter sets. The common parameters will be transmitted only once, thereby the signaling efficiency is improved.

Below is an example of the new QoS rule in the case that multiple data flows use the same QFI value described above:
QoS Rule
  QoS Rule Identifier
  QFI
  Parameter Set 1
    Packet filter1
    Precedence1
  Parameter Set 2
    Packet filter2
    Precedence2
  . . .
  Parameter Set x
    Packet filter x
    Precedence x
  // the parameters listed below are those common parameters for all the service data flows belonging to a QoS Flow

| | |
|---|---|
| GFBR UL | (if GBR) |
| GFRB DL | (if GBR) |
| MFBR UL | (if GBR) |
| MFBR DL | (if GBR) |
| Averaging Window | (if GBR) |
| 5QI | (if not the same as QFI) |
| EBI | (if EPS IWK is required) |
| Mapped QoS parameters | (if EPS IWK is required) |
| Mapped extended EPS QoS parameters | (if EPS IWK is required) |
| Mapped traffic flow template | |

In an embodiment, each of the one or more parameter sets is differentiated from each other by an identifier which is included in the one or more parameter sets. The identifier is shown as a parameter set identifier in the above example.

In an embodiment, each of the one or more parameter sets comprises parameters that are related to one or more service data flow (SDF) templates and/or one or more associated precedence values. For example, in the above example, each parameter set comprises one or more Packet filters and/or one or more precedence values.

As shown in FIG. 8, the method 800 may further comprise step S830 of transmitting the parameter set along with an identifier of the QoS rule to the UE if the QoS rule has already been transmitted, to enable the UE to update the QoS rule to include the parameter set. For example, if a new PCC rule is provided and it is bound to the same QoS Flow, a new parameter set may be generated from the new PCC rule. If parameters that are common to the QoS Flow do not change, only the parameter set is transmitted in step S830. In another embodiment, if any parameter in the QoS rule that are common to the QoS Flow changes, i.e., any parameter changes from that one in the previous QoS rule, the changed parameter is also transmitted to the UE in step S840, to enable the UE to update the common parameters for the QoS Flow.

As shown in FIG. 8, the method 800 may further comprise step S840 of transmitting a parameter and an identifier of a parameter set to which the parameter belongs along with an identifier of the QoS rule to the UE, to enable the UE to update the QoS rule by updating the parameter in the parameter set. For example, if a PCC rule changes, one or more parameters in the parameter set generated from the PCC may change. In such a case, the changed parameter and the identifier of the parameter set to which the parameter belongs are transmitted to the UE, to enable the UE to update the parameter.

Figure 9:
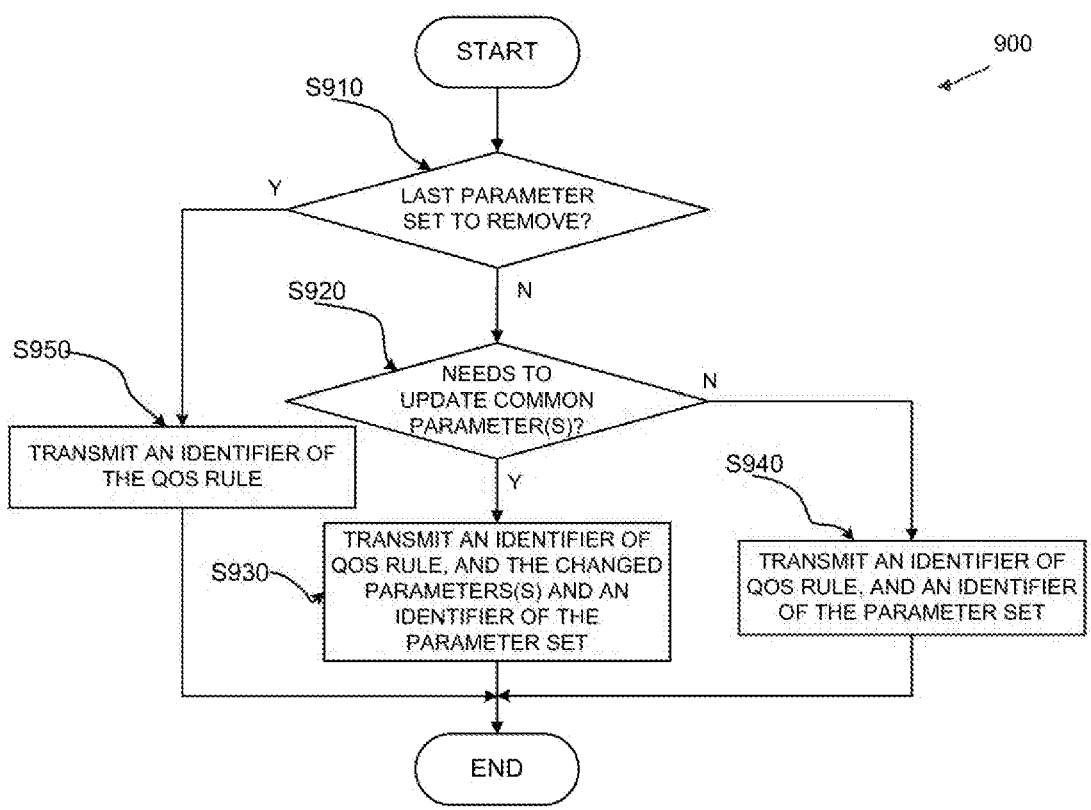
FIG. 9 illustratively shows a flowchart of a method for deleting a parameter set according to an exemplary embodiment of the present disclosure.

FIG. 9 illustratively shows a flowchart of a method 900 for deleting a parameter set according to an exemplary embodiment of the present disclosure. In an embodiment, the method 900 may be performed at a Network Function (NF) entity, such as a SW.

For example, when a PCC rule is removed, then a parameter set that comprises parameters specific to a service data flow (controlled by the PCC rule) shall be removed. As shown in FIG. 9, the method 900 may further comprise step S910 of determining whether the parameter set to be removed is the last one of the QoS Flow. If it is not the last one, it is determined whether it needs to update the common parameters in step S920. If anyone in the common parameters changes, an identifier of the QoS rule, the changed parameter and an identifier of the parameter set are transmitted in step S930. If there is no need to update the common parameters, only the identifier of the parameter set is transmitted in step S940. If the parameter set to be removed is the last one of the QoS Flow, an identifier of the QoS Flow, or an identifier of the QoS rule is transmitted in step S950. For example, when a data flow is removed, parameters associated with the data flow, i.e., the QoS rule, shall be removed, including the common parameters and the parameter set.

In an embodiment, in order to associate the transmitted parameter set/parameter with the QoS rule to which the parameter set belongs in steps S830, S840, S930, S940, an identifier of the QoS rule or an identifier of the QoS Flow is transmitted along, so that the UE may associated the received parameter set/parameter with the QoS rule.

Figure 10:
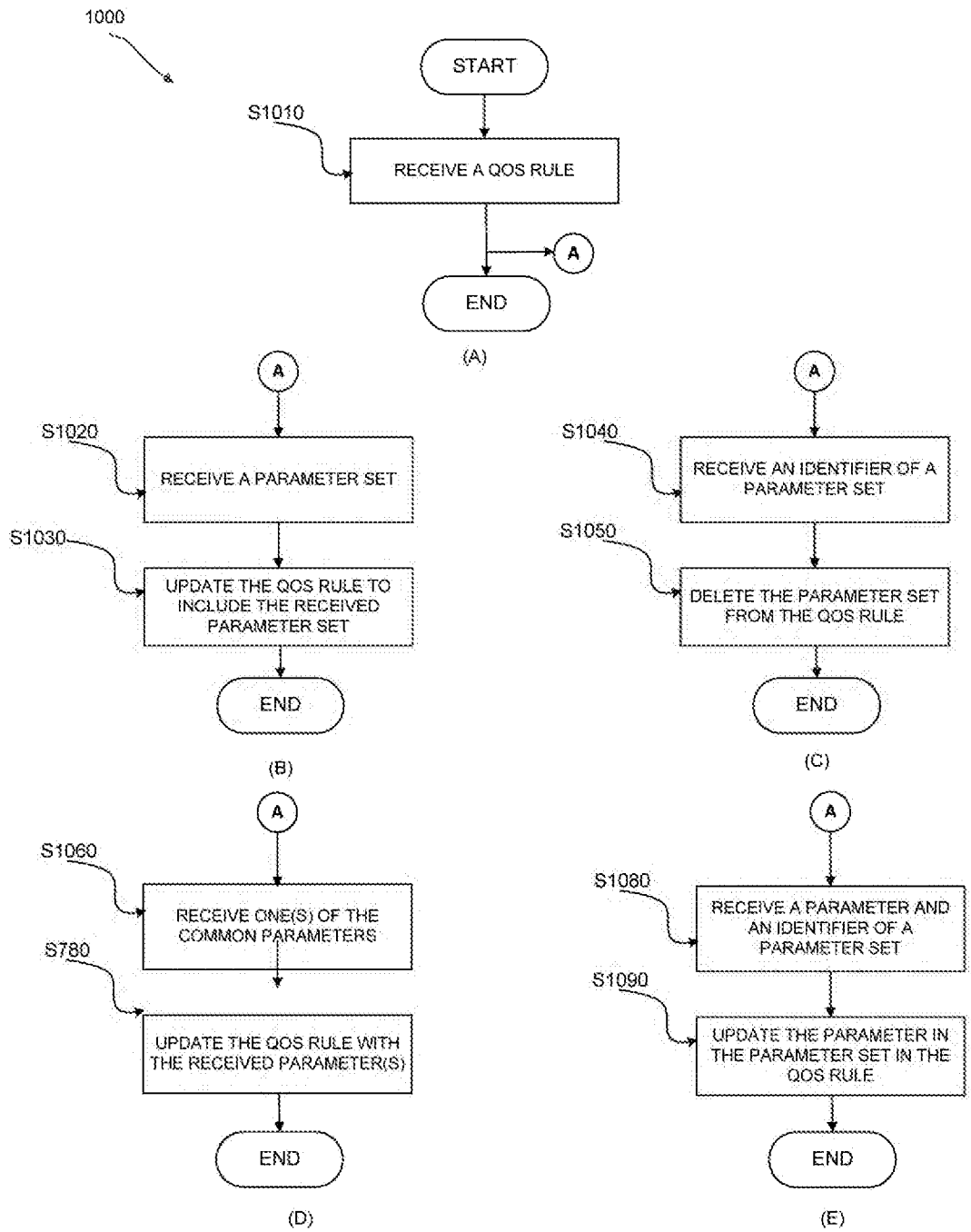
FIG. 10 illustratively shows a flowchart of a method for receiving a QoS rule according to an exemplary embodiment of the present disclosure.

FIG. 10 illustratively shows a flowchart of a method 1000 for receiving a QoS rule according to an exemplary embodiment of the present disclosure. In an embodiment, the method 1000 may be performed at a UE.

As shown in FIG. 10, the method 1000 may include Step S1010 of receiving a QoS rule associated with a QoS Flow, wherein the QoS rule comprises parameters common to all data flows that belong to the same QoS Flow, and one or more parameter sets, wherein each of the one or more parameter sets comprises parameters that are specific to a data flow that belongs to the QoS Flow.

In an embodiment, each of the one or more parameter sets is differentiated from each other by an identifier which is included in the one or more parameter sets. In the above example, the identifier is a parameter set identifier.

In an embodiment, as shown in FIG. 10, the method may include step S1020 of receiving a parameter set along with an identifier of the QoS rule. A parameter set that is received independently means that it is a new parameter set for the QoS Flow. By the identifier of the QoS rule that identifies the QoS Flow/QoS rule, the receiving entity (e.g., the UE) may update the QoS rule to include received parameter set in step S1030.

In an embodiment, as shown in FIG. 10, the method may include Step S1040 of receiving an identifier of a parameter set along with an identifier of the QoS rule. When an identifier of a parameter set is received, it is informed that the parameter set shall be deleted. The method 1000 thus may include step S1050 of updating the QoS rule by deleting the parameter set from the QoS rule.

In an embodiment, as shown in FIG. 10, the method may include Step S1060 of receiving one or more of the common parameters along with an identifier of the QoS rule, and Step S1070 of updating the corresponding parameter in the QoS rule with the received one. When the receiving entity (e.g., the UE) receives one or more of common parameters, it is informed to update the common parameters. The receiving entity thus will update those in the QoS rule with the received ones.

In an embodiment, as shown in FIG. 10, the method may include Step S1080 of receiving a parameter and an identifier of a parameter set to which the parameter belongs along with an identifier of the QoS rule, and Step S1090 of updating the QoS rule by updating the parameter in the parameter set. When the receiving entity receives one or more parameters in a parameter set, it is informed to update those in the parameter set. The receiving entity thus will update those in the parameter set with the received ones.

Figure 11:
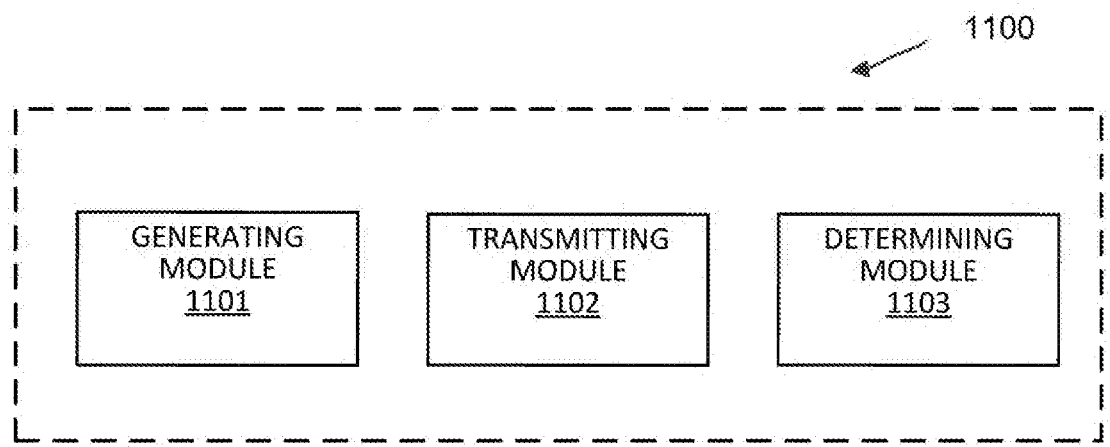
FIG. 11 illustratively shows a schematic structure diagram of an NF entity according to an exemplary embodiment of the present disclosure.

Hereinafter, a structure of an NF entity will be described with reference to FIG. 11. FIG. 11 illustratively shows a schematic structure diagram of an NF entity 1100 according to an exemplary embodiment of the present disclosure. The NF entity 1100 in FIG. 11 may perform the methods 500 and 600 for signaling parameters described previously with reference to FIGS. 5-6. Accordingly, some detailed description on the NF entity 1100 may refer to the corresponding description of the methods 400 and 500 for signaling parameters as previously discussed.

As shown in FIG. 11, the NF entity 1100 may include a generating module 1101, and a transmitting module 1102. As will be understood by the skilled in the art, common components in the NF entity 1100 are omitted in FIG. 11 for not obscuring the idea of the present disclosure. Also, some modules may be distributed in more modules or integrated into fewer modules.

The generating module 1101 of the NF entity 1100 may be configured to generate one or more data flow rules associated with a QoS Flow, and a QoS Flow profile to the UE for the QoS Flow.

The transmitting module 1102 of the NF entity 1100 may be configured to transmit the one or more data flow rules and the QoS Flow profile.

In an embodiment, the transmitting module 1102 of the NF entity 1100 may be further configured to transmit only the one or more data flow rules to the UE. For example, if a new PCC rule is provided and it is bound to the same QoS Flow, a new QoS rule may be generated from the new PCC rule. A new data flow rule is generated by the parameters that are specific to a service data flow (controlled by the PCC rule) in the new QoS rule. If parameters in the new QoS rule that are common to those in the QoS Flow profile do not change, only the new data flow rule is transmitted. In another embodiment, if any parameter in the new QoS rule that are common to those in the QoS Flow profile changes, i.e., any parameter changes from that one in the previous QoS Flow profile, the transmitting module 1102 of the NF entity 1100 may be further configured to transmit the changed parameter to the UE, to enable the UE to update the common parameters for the QoS Flow.

In an embodiment, the NF entity 1100 may further include a determining module 1103. The determining module 1103 of the NF entity 1100 may be configured to determine whether the data flow rule to be removed is the last one of the QoS Flow. If it is determined that it is not the last one, the determining module 1103 of the NF entity 1100 may be configured to determine whether it needs to update the QoS Flow profile. If it is determined that any parameter in the QoS Flow profile changes, the transmitting module 1102 of the NF entity 1100 transmits the changed parameter and an identifier of the data flow rule. If it is determined that there is no need to update the QoS Flow profile, the transmitting module 1102 of the NF entity 1100 transmits only the identifier of the data flow rule. If it is determined that the data flow rule to be removed is the last one of the QoS Flow, the transmitting module 1102 of the NF entity 1100 transmits an identifier of the QoS Flow. For example, when a data flow is removed, parameters associated with the data flow shall be removed, including the data flow rule and the QoS Flow profile. Alternatively, the transmitting module 1102 of the NF entity 1100 transmits an identifier of the QoS Flow and an identifier of the data flow rule, to inform the UE to remove all parameters associated with the data flow, including the data flow rule and the QoS Flow profile.

Figure 12:
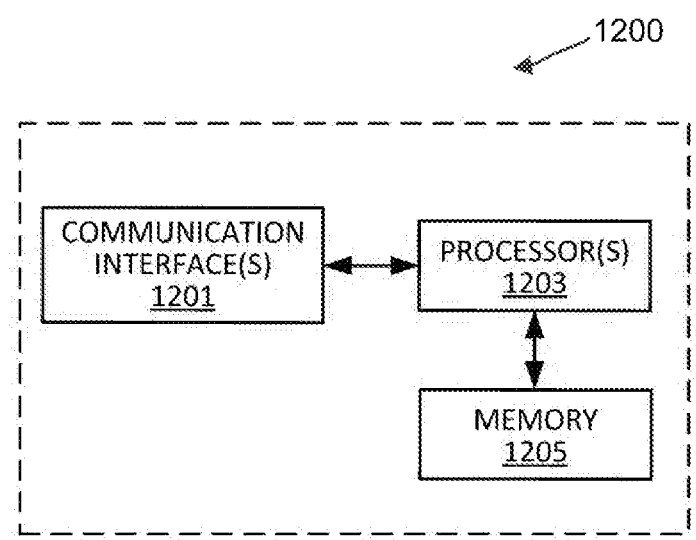
FIG. 12 illustratively shows a schematic structure diagram of an NF entity according to an exemplary embodiment of the present disclosure.

Hereinafter, another structure of an NF entity 1200 will be described with reference to FIG. 12. FIG. 12 illustratively shows a schematic structure diagram of an NF entity 1200 according to an exemplary embodiment of the present disclosure. The NF entity 1200 in FIG. 12 may perform the methods 500 and 600 for signaling parameters described previously with reference to FIGS. 5-6. Accordingly, some detailed description on the NF entity 1200 may refer to the corresponding description of the methods 500 and 600 for signaling parameters as previously discussed.

As shown in FIG. 12, the NF entity 1200 may include at least one controller or processor 1203 including e.g., any suitable Central Processing Unit, CPU, microcontroller, Digital Signal Processor, DSP, etc., capable of executing computer program instructions. The computer program instructions may be stored in a memory 1205. The memory 1205 may be any combination of a RAM (Random Access Memory) and a ROM (Read Only Memory). The memory may also comprise persistent storage, which, for example, can be any single one or combination of magnetic memory, optical memory, or solid state memory or even remotely mounted memory. The exemplary NF entity 1200 further comprises a communication interface 1201 arranged for communication.

The instructions, when loaded from the memory 1205 and executed by the at least one processor 1203, may cause the NF entity 1200 to perform the methods 500 and 600 as previously described.

In particular, the instructions, when loaded from the memory 1205 and executed by the at least one processor 1203, may cause the NF entity 1200 to generate one or more data flow rules associated with a QoS Flow, wherein each of the one or more data flow rules comprises parameters specific to a data flow that belongs to the QoS Flow, and generate a QoS Flow profile to the UE for the QoS Flow, wherein the QoS Flow profile comprises parameters that are common to all data flows that belong to the same QoS Flow. The instructions, when loaded from the memory 1205 and executed by the at least one processor 1203, may cause the NF entity 1200 to transmit the one or more data flow rules and the QoS Flow profile to the UE.

In an embodiment, each of the one or more data flow rules is represented by an identifier that is differentiated from each other which is transmitted to the UE. The identifier is shown as a data flow rule identifier in the above example.

In an embodiment, each of the one or more data flow rules comprises parameters that are related to one or more SDF templates and/or one or more associated precedence values. For example, in the above example, each data flow rule comprises one or more Packet filters and/or one or more precedence values.

In an embodiment, each of the one or more data flow rules and the QoS Flow profile to the UE comprises an identifier of the QoS Flow. For example, the identifier of the QoS Flow may be a QoS Flow Identifier (QFI).

The instructions, when loaded from the memory 1205 and executed by the at least one processor 1203, may cause the NF entity 1200 to transmit the one or more data flow rules to the UE. For example, if a new PCC rule is provided and it is bound to the same QoS Flow, a new QoS rule may be generated from the new PCC rule. A new data flow rule is generated by the parameters that are specific to a service data flow (controlled by the PCC rule) in the new QoS rule. If parameters in the new QoS rule that are common to those in the QoS Flow profile do not change, only the new data flow rule is transmitted. In another embodiment, if any parameter in the new QoS rule that are common to those in the QoS Flow profile changes, i.e., any parameter changes from that one in the previous QoS Flow profile, the instructions, when loaded from the memory 1205 and executed by the at least one processor 1203, may cause the NF entity 1200 to transmit also the changed parameter to the UE, to enable the UE to update the common parameters for the QoS Flow.

When a PCC rule is removed, then a data flow rule that comprises parameters specific to a service data flow (controlled by the PCC rule) shall be removed. The instructions, when loaded from the memory 1205 and executed by the at least one processor 1203, may cause the NF entity 1200 to determine whether the data flow rule to be removed is the last one of the QoS Flow. If it is not the last one, the instructions, when loaded from the memory 1205 and executed by the at least one processor 1203, may cause the NF entity 1200 to determine whether it needs to update the QoS Flow profile. If any parameter in the QoS Flow profile changes, the instructions, when loaded from the memory 1205 and executed by the at least one processor 1203, may cause the NF entity 1200 to transmit the changed parameter and an identifier of the data flow rule. If there is no need to update the QoS Flow profile, the instructions, when loaded from the memory 1205 and executed by the at least one processor 1203, may cause the NF entity 1200 to transmit only the identifier of the data flow rule. If the data flow rule to be removed is the last one of the QoS Flow, the instructions, when loaded from the memory 1205 and executed by the at least one processor 1203, may cause the NF entity 1200 to transmit an identifier of the QoS Flow. For example, when a data flow is removed, parameters associated with the data flow shall be removed, including the data flow rule and the QoS Flow profile. Alternatively, the instructions, when loaded from the memory 1205 and executed by the at least one processor 1203, may cause the NF entity 1200 to transmit an identifier of the QoS Flow and an identifier of the data flow rule, to inform the UE to remove all parameters associated with the data flow, including the data flow rule and the QoS Flow profile.

Figure 13:
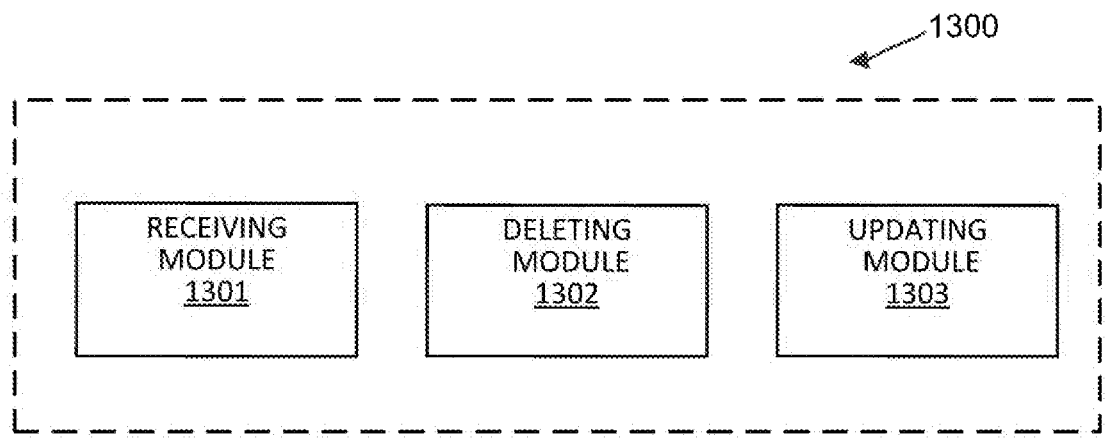
FIG. 13 illustratively shows a schematic structure diagram of an NF entity according to an exemplary embodiment of the present disclosure.

Hereinafter, a structure of a UE will be described with reference to FIG. 13. FIG. 13 illustratively shows a schematic structure diagram of an UE 1300 according to an exemplary embodiment of the present disclosure. The UE 1300 in FIG. 13 may perform the method 700 for receiving parameters described previously with reference to FIG. 7. Accordingly, some detailed description on the UE 1300 may refer to the corresponding description of the method 700 as previously discussed.

As shown in FIG. 13, the UE 1300 may include a receiving module 1301. As will be understood by the skilled in the art, common components in the UE 1300 are omitted in FIG. 13 for not obscuring the idea of the present disclosure. Also, some modules may be distributed in more modules or integrated into fewer modules.

The receiving module 1301 of the UE 1300 may be configured to receive one or more data flow rules associated with a QoS Flow. Each of the one or more data flow rules comprises parameters specific to a data flow that belongs to that QoS Flow. The receiving module 1301 of the UE 1300 may be further configured to receive a QoS Flow profile for the QoS Flow. The QoS Flow profile comprises parameters that are common to all data flows that belong to the same QoS Flow.

In an embodiment, each of the one or more data flow rules is represented by an identifier that is differentiated from each other which is also received. In the above example, the identifier is a data flow rule identifier.

In an embodiment, each of the one or more data flow rules and the QoS Flow profile comprises an identifier of the QoS Flow. For example, the identifier of the QoS Flow may be a QoS Flow Identifier (QFI).

In an embodiment, the receiving module 1301 of the UE 1300 may be further configured to receive an identifier of a data flow rule.

In an embodiment, the UE 1300 may include a deleting module 1302. When the receiving module 1301 receives an identifier of a data flow rule, it is informed that the data flow rule shall be deleted. The deleting module 1302 of the UE 1300 may be configured to delete the data flow rule.

In an embodiment, the receiving module 1301 of the UE 1300 may be further configured to receive a data flow rule. A data flow rule that is received independently means that it is a new data flow rule for the QoS Flow. By an identifier included in the data flow rule that identifies the QoS Flow, the UE 1300 may for example, bind the received data flow rule to the QoS Flow, and thereby to the QoS Flow profile of the QoS Flow.

In an embodiment, the receiving module 1301 of the UE 1300 may be further configured to receive an identifier of a QoS Flow to be removed. When an identifier of a QoS Flow to be removed is received, it is informed that all parameters associated with the QoS Flow shall be deleted. The deleting module 1302 of the UE 1300 thus may be configured to delete the data flow rule and the QoS Flow profile associated with the QoS Flow.

In an embodiment, the receiving module 1301 of the UE 1300 may be further configured to receive a parameter. When a parameter is received, it is informed that the parameter in the QoS Flow profile shall be updated.

In an embodiment, the UE 1300 may include an updating module 1303. When the receiving module 1301 receives a parameter, the updating module 1303 of the UE 1300 may be configured to update the parameter in the QoS Flow profile with the received parameter.

Figure 14:
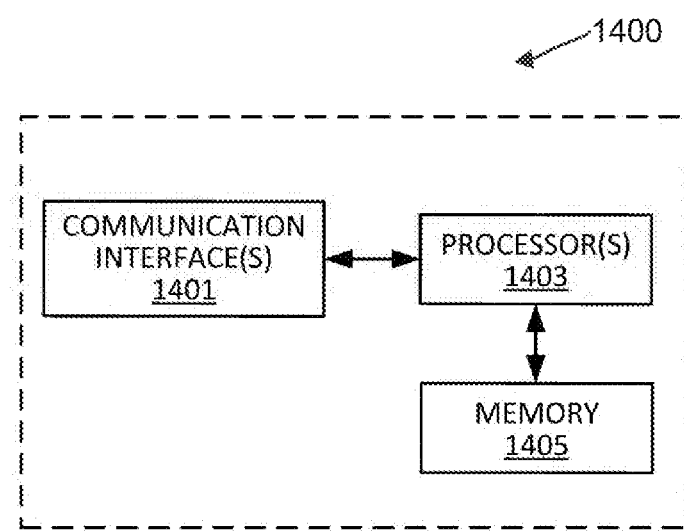
FIG. 14 illustratively shows a schematic structure diagram of a UE according to an exemplary embodiment of the present disclosure.

Hereinafter, another structure of an NF entity will be described with reference to FIG. 14. FIG. 14 illustratively shows a schematic structure diagram of a UE 1400 according to an exemplary embodiment of the present disclosure. The UE 1400 in FIG. 14 may perform the method 700 for receiving parameters described previously with reference to FIG. 5. Accordingly, some detailed description on the UE 1400 may refer to the corresponding description of the method 500 as previously discussed.

As shown in FIG. 14, the UE 1400 may include at least one controller or processor 1403 including e.g., any suitable Central Processing Unit, CPU, microcontroller, Digital Signal Processor, DSP, etc., capable of executing computer program instructions. The computer program instructions may be stored in a memory 1405. The memory 1405 may be any combination of a RAM (Random Access Memory) and a ROM (Read Only Memory). The memory may also comprise persistent storage, which, for example, can be any single one or combination of magnetic memory, optical memory, or solid state memory or even remotely mounted memory. The exemplary UE 1400 further comprises a communication interface 1401 arranged for communication.

The instructions, when loaded from the memory 1405 and executed by the at least one processor 1403, may cause the UE 1400 to perform the method 700 as previously described.

In particular, the instructions, when loaded from the memory 1405 and executed by the at least one processor 1403, may cause the UE 1400 to receive one or more data flow rules associated with a QoS Flow and a QoS Flow profile for the QoS Flow.

Each of the one or more data flow rules comprises parameters specific to a data flow that belongs to that QoS Flow. The QoS Flow profile comprises parameters that are common to all data flows that belong to the same QoS Flow.

In an embodiment, each of the one or more data flow rules is represented by an identifier that is differentiated from each other which is also received. In the above example, the identifier is a data flow rule identifier.

In an embodiment, each of the one or more data flow rules and the QoS Flow profile so comprises an identifier of the QoS Flow. For example, the identifier of the QoS Flow may be a QoS Flow Identifier (QFI).

In an embodiment of the present disclosure, the instructions, when loaded from the memory 1405 and executed by the at least one processor 1403, may cause the UE 1400 to receive an identifier of a data flow rule. When an identifier of a data flow rule is received, it is informed that the data flow rule shall be deleted. The instructions, when loaded from the memory 1405 and executed by the at least one processor 1403, may cause the UE 1400 to delete the data flow rule.

In an embodiment of the present disclosure, the instructions, when loaded from the memory 1405 and executed by the at least one processor 1403, may cause the UE 1400 to receive a data flow rule. A data flow rule that is received independently means that it is a new data flow rule for the QoS Flow. By an identifier included in the data flow rule that identifies the QoS Flow, the NF entity may for example, bind the received data flow rule to the QoS Flow, and thereby to the QoS Flow profile of the QoS Flow.

In an embodiment of the present disclosure, the instructions, when loaded from the memory 1405 and executed by the at least one processor 1403, may cause the UE 1400 to receive an identifier of a QoS Flow to be removed. When an identifier of a QoS Flow to be removed is received, it is informed that all parameters associated with the QoS Flow shall be deleted. The instructions, when loaded from the memory 1405 and executed by the at least one processor 1403, may cause the UE 1400 to delete the data flow rule and the QoS Flow profile associated with the QoS Flow.

In an embodiment of the present disclosure, the instructions, when loaded from the memory 1405 and executed by the at least one processor 1403, may cause the UE 1400 to receive a parameter. When a parameter is received, it is informed that the parameter in the QoS Flow profile shall be updated. The instructions, when loaded from the memory 1405 and executed by the at least one processor 1403, may cause the UE 1400 to update the parameter in the QoS Flow profile with the received parameter.

Figure 15:
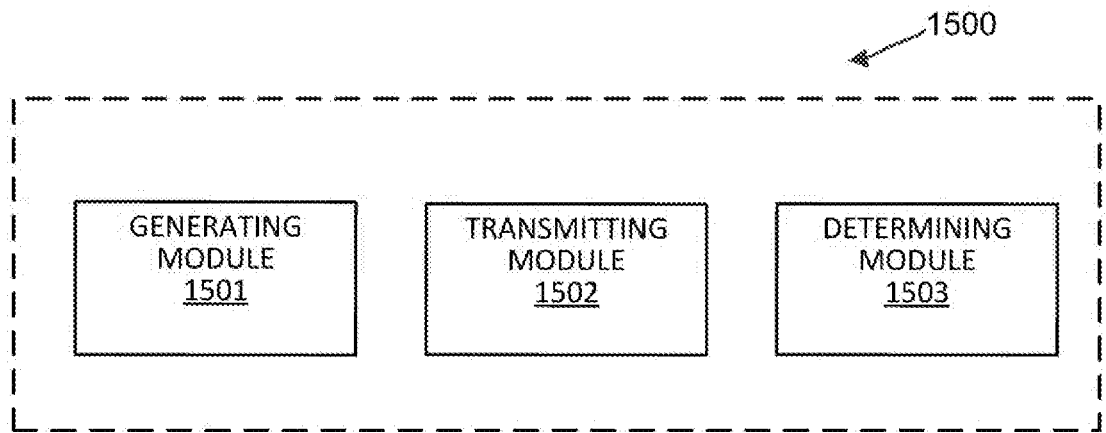
FIG. 15 illustratively shows a schematic structure diagram of an NF entity according to an exemplary embodiment of the present disclosure.

Hereinafter, a structure of an NF entity will be described with reference to FIG. 15. FIG. 15 illustratively shows a schematic structure diagram of an NF entity 1500 according to an exemplary embodiment of the present disclosure. The NF entity 1500 in FIG. 15 may perform the methods 800 and 900 for signaling a QoS rule to a UE described previously with reference to FIGS. 8-9. Accordingly, some detailed description on the NF entity 1500 may refer to the corresponding description of the methods 800 and 900 for signaling a QoS rule to a UE as previously discussed.

As shown in FIG. 15, the NF entity 1500 may include a generating module 1501, and a transmitting module 1502. As will be understood by the skilled in the art, common components in the NF entity 1500 are omitted in FIG. 15 for not obscuring the idea of the present disclosure. Also, some modules may be distributed in more modules or integrated into fewer modules.

The generating module 1501 of the NF entity 1500 may be configured to generate QoS rule associated with a QoS Flow. The QoS rule comprises parameters common to all SDFs that belong to the same QoS Flow, and one or more parameter sets, wherein each of the one or more parameter sets comprises parameters that are specific to a SDF that belongs to the QoS Flow.

The transmitting module 1502 of the NF entity 1500 may be configured to transmit the generated QoS rule.

In an embodiment, the transmitting module 1502 of the NF entity 1500 may be further configured to transmit the parameter set along with an identifier of the QoS rule to the UE if the QoS rule has already been transmitted, to enable the UE to update the QoS rule to include the parameter set. For example, if a new PCC rule is provided and it is bound to the same QoS Flow, a new parameter set may be generated from the new PCC rule. If parameters that are common to the QoS Flow do not change, the transmitting module 1502 of the NF entity 1500 transmits only the parameter set. In another embodiment, if any parameter in the QoS rule that are common to the QoS Flow changes, i.e., any parameter changes from that one in the previous QoS rule, the transmitting module 1502 of the NF entity 1500 also transmits the changed parameter, to enable the UE to update the common parameters for the QoS Flow.

In an embodiment, the transmitting module 1502 of the NF entity 1500 may be further configured to transmit a parameter and an identifier of a parameter set to which the parameter belongs along with an identifier of the QoS rule to the UE, to enable the UE to update the QoS rule by updating the parameter in the parameter set. For example, if a PCC rule changes, one or more parameters in the parameter set generated from the PCC may change. In such a case, the changed parameter and the identifier of the parameter set to which the parameter belongs are transmitted to the UE, to enable the UE to update the parameter.

In an embodiment, the NF entity 1500 may further include a determining module 1503. The determining module 1503 of the NF entity 1500 may be configured to determine whether the parameter set to be removed is the last one of the QoS Flow. If it is not the last one, the determining module 1503 of the NF entity 1500 may be configured to determine whether it needs to update the common parameters. If anyone in the common parameters changes, the transmitting module 1502 of the NF entity 1500 may be further configured to transmit the changed parameter and an identifier of the parameter set. If there is no need to update the common parameters, the transmitting module 1502 of the NF entity 1500 may be further configured to transmit only the identifier of the parameter set. If the parameter set to be removed is the last one of the QoS Flow, the transmitting module 1502 of the NF entity 1500 may be further configured to transmit an identifier of the QoS Flow, or an identifier of the QoS rule. For example, when a data flow is removed, parameters associated with the data flow, i.e., the QoS rule, shall be removed, including the common parameters and the parameter set.

Figure 16:
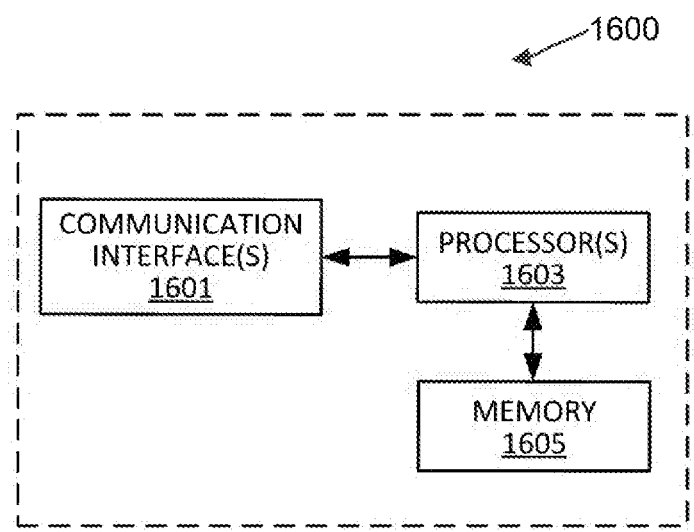
FIG. 16 illustratively shows a schematic structure diagram of an NF entity according to an exemplary embodiment of the present disclosure.

Hereinafter, another structure of an NF entity 1600 will be described with reference to FIG. 16. FIG. 16 illustratively shows a schematic structure diagram of an NF entity 1600 according to an exemplary embodiment of the present disclosure. The NF entity 1600 in FIG. 16 may perform the methods 800 and 900 for signaling a QoS rule to a UE described previously with reference to FIGS. 8 and 9. Accordingly, some detailed description on the NF entity 1600 may refer to the corresponding description of the methods 800 and 900 for signaling a QoS rule to a UE as previously discussed.

As shown in FIG. 16, the NF entity 1600 may include at least one controller or processor 1603 including e.g., any suitable Central Processing Unit, CPU, microcontroller, Digital Signal Processor, DSP, etc., capable of executing computer program instructions. The computer program instructions may be stored in a memory 1605. The memory 1605 may be any combination of a RAM (Random Access Memory) and a ROM (Read Only Memory). The memory may also comprise persistent storage, which, for example, can be any single one or combination of magnetic memory, optical memory, or solid state memory or even remotely mounted memory. The exemplary NF entity 1600 further comprises a communication interface 1601 arranged for communication.

The instructions, when loaded from the memory 1605 and executed by the at least one processor 1603, may cause the NF entity 1600 to perform the methods 800 and 900 as previously described.

In particular, the instructions, when loaded from the memory 1605 and executed by the at least one processor 1603, may cause the NF entity 1600 to generate QoS rule associated with a QoS Flow. The QoS rule comprises parameters common to all SDFs that belong to the same QoS Flow, and one or more parameter sets, wherein each of the one or more parameter sets comprises parameters that are specific to a SDF that belongs to the QoS Flow.

The instructions, when loaded from the memory 1605 and executed by the at least one processor 1603, may cause the NF entity 1600 to transmit the parameter set along with an identifier of the QoS rule to the UE if the QoS rule has already been transmitted, to enable the UE to update the QoS rule to include the parameter set. For example, if a new PCC rule is provided and it is bound to the same QoS Flow, a new parameter set may be generated from the new PCC rule. If parameters that are common to the QoS Flow do not change, the instructions, when loaded from the memory 1605 and executed by the at least one processor 1603, may cause the NF entity 1600 to transmit only the parameter set. In another embodiment, if any parameter in the QoS rule that are common to the QoS Flow changes, i.e., any parameter changes from that one in the previous QoS rule, the instructions, when loaded from the memory 1605 and executed by the at least one processor 1603, may cause the NF entity 1600 to transmit the changed parameter, to enable the UE to update the common parameters for the QoS Flow.

In an embodiment, the instructions, when loaded from the memory 1605 and executed by the at least one processor 1603, may cause the NF entity 1600 to transmit a parameter and an identifier of a parameter set to which the parameter belongs along with an identifier of the QoS rule to the UE, to enable the UE to update the QoS rule by updating the parameter in the parameter set. For example, if a PCC rule changes, one or more parameters in the parameter set generated from the PCC may change. In such a case, the changed parameter and the identifier of the parameter set to which the parameter belongs are transmitted to the UE, to enable the UE to update the parameter.

In an embodiment, the instructions, when loaded from the memory 1605 and executed by the at least one processor 1603, may cause the NF entity 1600 to determine whether the parameter set to be removed is the last one of the QoS Flow. If it is not the last one, the instructions, when loaded from the memory 1605 and executed by the at least one processor 1603, may cause the NF entity 1600 to determine whether it needs to update the common parameters. If anyone in the common parameters changes, the instructions, when loaded from the memory 1605 and executed by the at least one processor 1603, may cause the NF entity 1600 to transmit the changed parameter and an identifier of the parameter set. If there is no need to update the common parameters, the instructions, when loaded from the memory 1605 and executed by the at least one processor 1603, may cause the NF entity 1600 to transmit only the identifier of the parameter set. If the parameter set to be removed is the last one of the QoS Flow, the instructions, when loaded from the memory 1605 and executed by the at least one processor 1603, may cause the NF entity 1600 to transmit an identifier of the QoS Flow, or an identifier of the QoS rule. For example, when a data flow is removed, parameters associated with the data flow, i.e., the QoS rule, shall be removed, including the common parameters and the parameter set.

Figure 17:
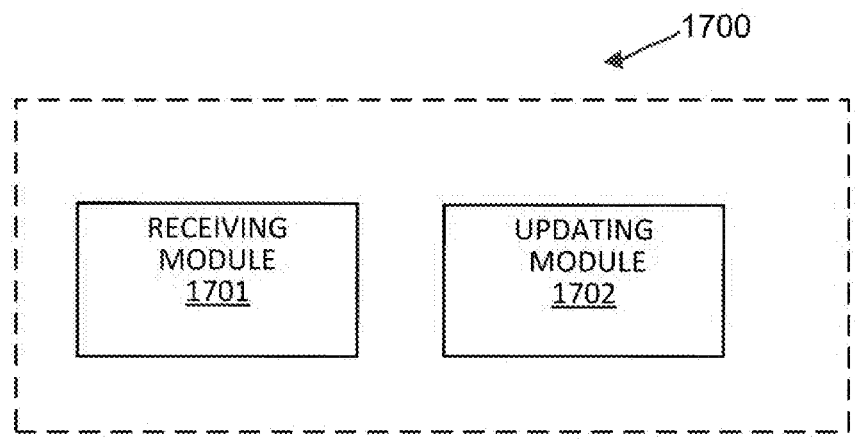
FIG. 17 illustratively shows a schematic structure diagram of an NF entity according to an exemplary embodiment of the present disclosure.

Hereinafter, a structure of a UE will be described with reference to FIG. 17. FIG. 17 illustratively shows a schematic structure diagram of an UE 1700 according to an exemplary embodiment of the present disclosure. The UE 1700 in FIG. 17 may perform the method 1000 for receiving a QoS rule described previously with reference to FIG. 10.

Accordingly, some detailed description on the UE 1700 may refer to the corresponding description of the method 1000 as previously discussed.

As shown in FIG. 17, the UE 1700 may include a receiving module 1701. As will be understood by the skilled in the art, common components in the UE 1700 are omitted in FIG. 17 for not obscuring the idea of the present disclosure. Also, some modules may be distributed in more modules or integrated into fewer modules.

The receiving module 1701 of the UE 1700 may be configured to receive a QoS rule associated with a QoS Flow, wherein the QoS rule comprises parameters common to all data flows that belong to the same QoS Flow, and one or more parameter sets, wherein each of the one or more parameter sets comprises parameters that are specific to a data flow that belongs to the QoS Flow.

In an embodiment, each of the one or more parameter sets is differentiated from each other by an identifier which is included in the one or more parameter sets. In the above example, the identifier is a parameter set identifier.

In an embodiment, the UE 1700 may include an updating module 1702.

In an embodiment, the receiving module 1701 of the UE 1700 may be configured to receive a parameter set along with an identifier of the QoS rule. A parameter set that is received independently means that it is a new parameter set for the QoS Flow. By the identifier of the QoS rule that identifies the QoS Flow/QoS rule, the updating module 1702 of the UE 1700 may be configured to update the QoS rule to include received parameter set.

In an embodiment, the receiving module 1701 of the UE 1700 may be configured to receive an identifier of a parameter set along with an identifier of the QoS rule. When an identifier of a parameter set is received, it is informed that the parameter set shall be deleted. The updating module 1702 of the UE 1700 may be configured to update the QoS rule by deleting the parameter set from the QoS rule.

In an embodiment, the receiving module 1701 of the UE 1700 may be configured to receive one or more of the common parameters along with an identifier of the QoS rule, and the updating module 1702 of the UE 1700 may be configured to update the corresponding parameter in the QoS rule with the received one. When the receiving entity (e.g., the UE) receives one or more of common parameters, it is informed to update the common parameters. The UE 1700 thus will update those in the QoS rule with the received ones.

In an embodiment, the receiving module 1701 of the UE 1700 may be configured to receive a parameter and an identifier of a parameter set to which the parameter belongs along with an identifier of the QoS rule, and the updating module 1702 of the UE 1700 may be configured to update the QoS rule by updating the parameter in the parameter set. When the receiving entity receives one or more parameters in a parameter set, it is informed to update those in the parameter set. The receiving entity thus will update those in the parameter set with the received ones.

Figure 18:
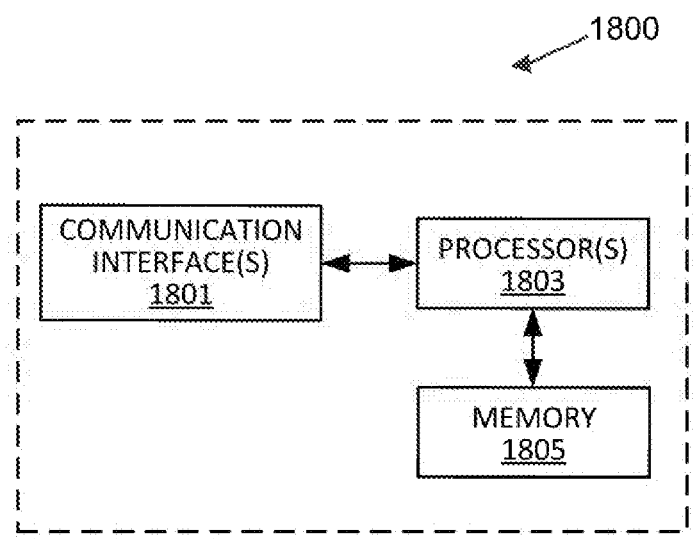
FIG. 18 illustratively shows a schematic structure diagram of a UE according to an exemplary embodiment of the present disclosure.

Hereinafter, another structure of an NF entity will be described with reference to FIG. 18. FIG. 18 illustratively shows a schematic structure diagram of an UE 1800 according to an exemplary embodiment of the present disclosure. The UE 1800 in FIG. 18 may perform the method 1000 for receiving a QoS rule described previously with reference to FIG. 10. Accordingly, some detailed description on the UE 1800 may refer to the corresponding description of the method 1000 as previously discussed.

As shown in FIG. 18, the UE 1800 may include at least one controller or processor 1803 including e.g., any suitable Central Processing Unit, CPU, microcontroller, Digital Signal Processor, DSP, etc., capable of executing computer program instructions. The computer program instructions may be stored in a memory 1805. The memory 1805 may be any combination of a RAM (Random Access Memory) and a ROM (Read Only Memory). The memory may also comprise persistent storage, which, for example, can be any single one or combination of magnetic memory, optical memory, or solid state memory or even remotely mounted memory.

The exemplary UE 1800 further comprises a communication interface 1801 arranged for communication.

The instructions, when loaded from the memory 1805 and executed by the at least one processor 1803, may cause the UE 1800 to perform the method 1000 as previously described.

In particular, the instructions, when loaded from the memory 1805 and executed by the at least one processor 1803, may cause the UE 1800 to receive a QoS rule associated with a QoS Flow, wherein the QoS rule comprises parameters common to all data flows that belong to the same QoS Flow, and one or more parameter sets, wherein each of the one or more parameter sets comprises parameters that are specific to a data flow that belongs to the QoS Flow.

In an embodiment of the present disclosure, the instructions, when loaded from the memory 1805 and executed by the at least one processor 1803, may cause the UE 1800 to receive a parameter set along with an identifier of the QoS rule. A parameter set that is received independently means that it is a new parameter set for the QoS Flow. By the identifier of the QoS rule that identifies the QoS Flow/QoS rule, the UE 1800 may update the QoS rule to include received parameter set.

In an embodiment of the present disclosure, the instructions, when loaded from the memory 1805 and executed by the at least one processor 1803, may cause the UE 1800 to receive an identifier of a parameter set along with an identifier of the QoS rule. When an identifier of a parameter set is received, it is informed that the parameter set shall be deleted. The instructions, when loaded from the memory 1805 and executed by the at least one processor 1803, may cause the UE 1800 to update the QoS rule by deleting the parameter set from the QoS rule.

In an embodiment of the present disclosure, the instructions, when loaded from the memory 1805 and executed by the at least one processor 1803, may cause the UE 1800 to receive one or more of the common parameters along with an identifier of the QoS rule, and to update the corresponding parameter in the QoS rule with the received one. When the receiving entity (e.g., the UE) receives one or more of common parameters, it is informed to update the common parameters. The receiving entity thus will update those in the QoS rule with the received ones.

In an embodiment of the present disclosure, the instructions, when loaded from the memory 1805 and executed by the at least one processor 1803, may cause the UE 1800 to receive a parameter and an identifier of a parameter set to which the parameter belongs along with an identifier of the QoS rule, and to update the QoS rule by updating the parameter in the parameter set. When the receiving entity receives one or more parameters in a parameter set, it is informed to update those in the parameter set. The receiving entity thus will update those in the parameter set with the received ones.

Figure 19:
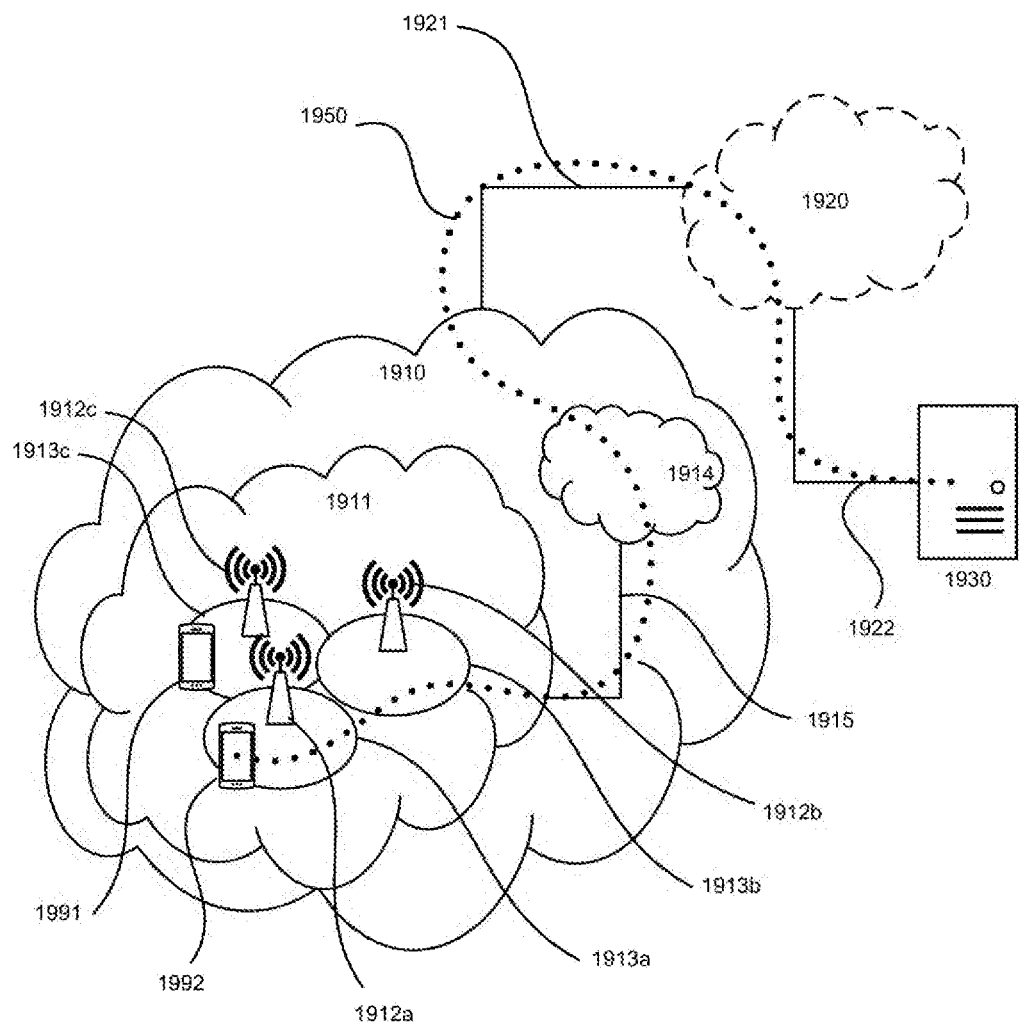
FIG. 19 schematically illustrates a telecommunication network connected via an intermediate network to a host computer.

With reference to FIG. 19, in accordance with an embodiment, a communication system includes a telecommunication network 1910, such as a 3GPP-type cellular network, which comprises an access network 1911, such as a radio access network, and a core network 1914. The access network 1911 comprises a plurality of base stations 1912a, 1912b, 1912c, such as NBs, eNBs, gNBs or other types of wireless access points, each defining a corresponding coverage area 1913a, 1913b, 1913c. Each base station 1912a, 1912b, 1912c is connectable to the core network 1914 over a wired or wireless connection 1915. A first user equipment (UE) 1991 located in coverage area 1913c is configured to wirelessly connect to, or be paged by, the corresponding base station 1912c. A second UE 1992 in coverage area 1913a is wirelessly connectable to the corresponding base station 1912a. While a plurality of UEs 1991, 1992 are illustrated in this example, the disclosed embodiments are equally applicable to a situation where a sole UE is in the coverage area or where a sole UE is connecting to the corresponding base station 1912.

The telecommunication network 1910 is itself connected to a host computer 1930, which may be embodied in the hardware and/or software of a standalone server, a cloud-implemented server, a distributed server or as processing resources in a server farm. The host computer 1930 may be under the ownership or control of a service provider, or may be operated by the service provider or on behalf of the service provider. The connections 1921, 1922 between the telecommunication network 1910 and the host computer 1930 may extend directly from the core network 1914 to the host computer 1930 or may go via an optional intermediate network 1920. The intermediate network 1920 may be one of, or a combination of more than one of, a public, private or hosted network; the intermediate network 1920, if any, may be a backbone network or the Internet; in particular, the intermediate network 1920 may comprise two or more sub-networks (not shown).

The communication system of FIG. 19 as a whole enables connectivity between one of the connected UEs 1991, 1992 and the host computer 1930. The connectivity may be described as an over-the-top (OTT) connection 1950. The host computer 1930 and the connected UEs 1991, 1992 are configured to communicate data and/or signaling via the OTT connection 1950, using the access network 1911, the core network 1914, any intermediate network 1920 and possible further infrastructure (not shown) as intermediaries. The OTT connection 1950 may be transparent in the sense that the participating communication devices through which the OTT connection 1950 passes are unaware of routing of uplink and downlink communications. For example, a base station 1912 may not or need not be informed about the past routing of an incoming downlink communication with data originating from a host computer 1930 to be forwarded (e.g., handed over) to a connected UE 1991. Similarly, the base station 1912 need not be aware of the future routing of an outgoing uplink communication originating from the UE 1991 towards the host computer 1930.

Example implementations, in accordance with an embodiment, of the UE, base station and host computer discussed in the preceding paragraphs will now be described with reference to FIG. 20. In a communication system 2000, a host computer 2010 comprises hardware 2015 including a communication interface 2016 configured to set up and maintain a wired or wireless connection with an interface of a different communication device of the communication system 2000. The host computer 2010 further comprises processing circuitry 2018, which may have storage and/or processing capabilities. In particular, the processing circuitry 2018 may comprise one or more programmable processors, application-specific integrated circuits, field programmable gate arrays or combinations of these (not shown) adapted to execute instructions. The host computer 2010 further comprises software 2011, which is stored in or accessible by the host computer 2010 and executable by the processing circuitry 2018. The software 2011 includes a host application 2012. The host application 2012 may be operable to provide a service to a remote user, such as a UE 2030 connecting via an OTT connection 2050 terminating at the UE 2030 and the host computer 2010. In providing the service to the remote user, the host application 2012 may provide user data which is transmitted using the OTT connection 2050.

The communication system 2000 further includes a base station 2020 provided in a telecommunication system and comprising hardware 2025 enabling it to communicate with the host computer 2010 and with the UE 2030. The hardware 2025 may include a communication interface 2026 for setting up and maintaining a wired or wireless connection with an interface of a different communication device of the communication system 2000, as well as a radio interface 2027 for setting up and maintaining at least a wireless connection 2070 with a UE 2030 located in a coverage area (not shown in FIG. 20) served by the base station 2020. The communication interface 2026 may be configured to facilitate a connection 2060 to the host computer 2010. The connection 2060 may be direct or it may pass through a core network (not shown in FIG. 20) of the telecommunication system and/or through one or more intermediate networks outside the telecommunication system. In the embodiment shown, the hardware 2025 of the base station 2020 further includes processing circuitry 2028, which may comprise one or more programmable processors, application-specific integrated circuits, field programmable gate arrays or combinations of these (not shown) adapted to execute instructions. The base station 2020 further has software 2021 stored internally or accessible via an external connection.

The communication system 2000 further includes the UE 2030 already referred to. Its hardware 2035 may include a radio interface 2037 configured to set up and maintain a wireless connection 2070 with a base station serving a coverage area in which the UE 2030 is currently located. The hardware 2035 of the UE 2030 further includes processing circuitry 2038, which may comprise one or more programmable processors, application-specific integrated circuits, field programmable gate arrays or combinations of these (not shown) adapted to execute instructions. The UE 2030 further comprises software 2031, which is stored in or accessible by the UE 2030 and executable by the processing circuitry 2038. The software 2031 includes a client application 2032. The client application 2032 may be operable to provide a service to a human or non-human user via the UE 2030, with the support of the host computer 2010. In the host computer 2010, an executing host application 2012 may communicate with the executing client application 2032 via the OTT connection 2050 terminating at the UE 2030 and the host computer 2010. In providing the service to the user, the client application 2032 may receive request data from the host application 2012 and provide user data in response to the request data. The OTT connection 2050 may transfer both the request data and the user data. The client application 2032 may interact with the user to generate the user data that it provides.

Figure 20:
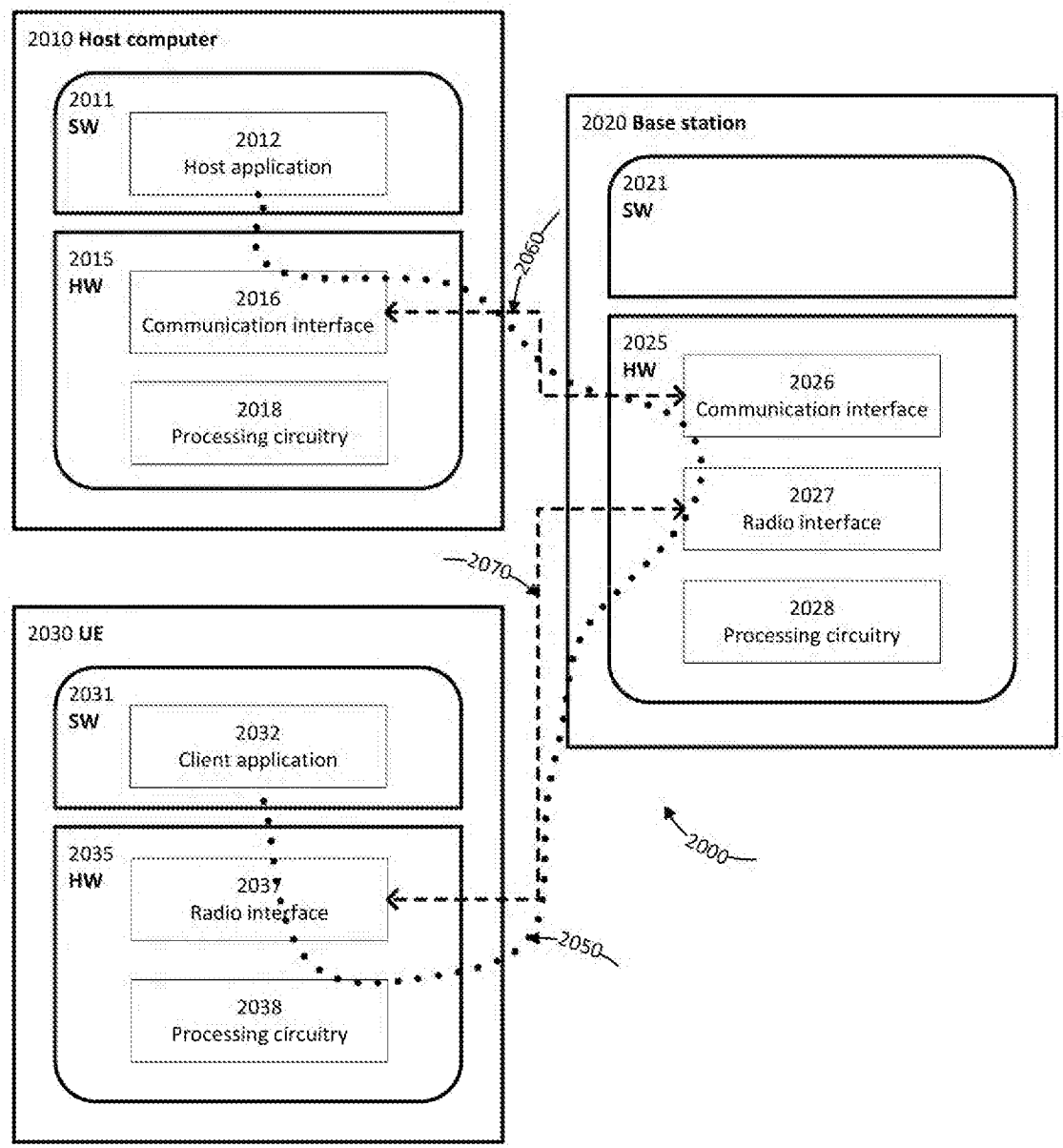
FIG. 20 is a generalized block diagram of a host computer communicating via a base station with a user equipment over a partially wireless connection.

It is noted that the host computer 2010, base station 2020 and UE 2030 illustrated in FIG. 20 may be identical to the host computer 1930, one of the base stations 1912a, 1912b, 1912c and one of the UEs 1991, 1992 of FIG. 19, respectively. This is to say, the inner workings of these entities may be as shown in FIG. 20 and independently, the surrounding network topology may be that of FIG. 19.

In FIG. 20, the OTT connection 2050 has been drawn abstractly to illustrate the communication between the host computer 2010 and the use equipment 2030 via the base station 2020, without explicit reference to any intermediary devices and the precise routing of messages via these devices. Network infrastructure may determine the routing, which it may be configured to hide from the UE 2030 or from the service provider operating the host computer 2010, or both. While the OTT connection 2050 is active, the network infrastructure may further take decisions by which it dynamically changes the routing (e.g., on the basis of load balancing consideration or reconfiguration of the network).

The wireless connection 2070 between the UE 2030 and the base station 2020 is in accordance with the teachings of the embodiments described throughout this disclosure. One or more of the various embodiments improve the performance of OTT services provided to the UE 2030 using the OTT connection 2050, in which the wireless connection 2070 forms the last segment. More precisely, the teachings of these embodiments may improve the latency and thereby provide benefits such as reduced user waiting time and better responsiveness.

A measurement procedure may be provided for the purpose of monitoring data rate, latency and other factors on which the one or more embodiments improve. There may further be an optional network functionality for reconfiguring the OTT connection 2050 between the host computer 2010 and UE 2030, in response to variations in the measurement results. The measurement procedure and/or the network functionality for reconfiguring the OTT connection 2050 may be implemented in the software 2011 of the host computer 2010 or in the software 2031 of the UE 2030, or both. In embodiments, sensors (not shown) may be deployed in or in association with communication devices through which the OTT connection 2050 passes; the sensors may participate in the measurement procedure by supplying values of the monitored quantities exemplified above, or supplying values of other physical quantities from which software 2011, 2031 may compute or estimate the monitored quantities. The reconfiguring of the OTT connection 2050 may include message format, retransmission settings, preferred routing etc.; the reconfiguring need not affect the base station 2020, and it may be unknown or imperceptible to the base station 2020. Such procedures and functionalities may be known and practiced in the art. In certain embodiments, measurements may involve proprietary UE signaling facilitating the host computer's 2010 measurements of throughput, propagation times, latency and the like. The measurements may be implemented in that the software 2011, 2031 causes messages to be transmitted, in particular empty or 'dummy' messages, using the OTT connection 2050 while it monitors propagation times, errors etc.

Figure 21:
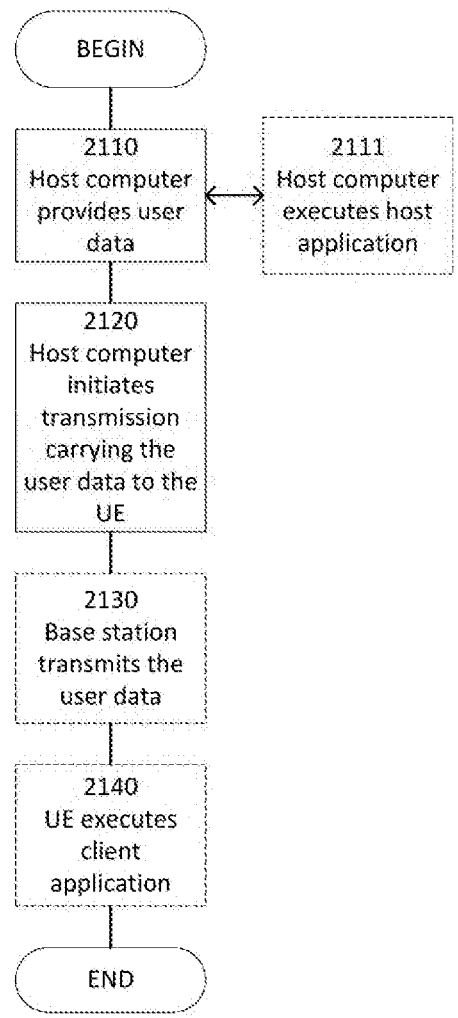

FIG. 21 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 21 will be included in this section. In a first step 2110 of the method, the host computer provides user data. In an optional substep 2111 of the first step 2110, the host computer provides the user data by executing a host application. In a second step 2120, the host computer initiates a transmission carrying the user data to the UE. In an optional third step 2130, the base station transmits to the UE the user data which was carried in the transmission that the host computer initiated, in accordance with the teachings of the embodiments described throughout this disclosure. In an optional fourth step 2140, the UE executes a client application associated with the host application executed by the host computer.

Figure 22:
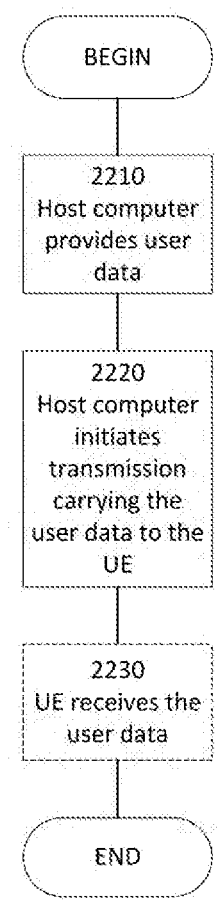

FIG. 22 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 22 will be included in this section. In a first step 2210 of the method, the host computer provides user data. In an optional substep (not shown) the host computer provides the user data by executing a host application. In a second step 2220, the host computer initiates a transmission carrying the user data to the UE. The transmission may pass via the base station, in accordance with the teachings of the embodiments described throughout this disclosure. In an optional third step 2230, the UE receives the user data carried in the transmission.

FIG. 23 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 23 will be included in this section. In an optional first step 2310 of the method, the UE receives input data provided by the host computer. Additionally or alternatively, in an optional second step 2320, the UE provides user data. In an optional substep 2321 of the second step 2320, the UE provides the user data by executing a client application. In a further optional substep 2311 of the first step 2310, the UE executes a client application which provides the user data in reaction to the received input data provided by the host computer. In providing the user data, the executed client application may further consider user input received from the user. Regardless of the specific manner in which the user data was provided, the UE initiates, in an optional third substep 2330, transmission of the user data to the host computer. In a fourth step 2340 of the method, the host computer receives the user data transmitted from the UE, in accordance with the teachings of the embodiments described throughout this disclosure.

FIG. 24 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 24 will be included in this section. In an optional first step 2410 of the method, in accordance with the teachings of the embodiments described throughout this disclosure, the base station receives user data from the UE. In an optional second step 2420, the base station initiates transmission of the received user data to the host computer. In a third step 2430, the host computer receives the user data carried in the transmission initiated by the base station.

The foregoing description of implementations provides illustration and description, but is not intended to be exhaustive or to limit the disclosure to the precise form disclosed. Modifications and variations are possible in light of the above teachings, or may be acquired from practice of the disclosure.

Aspects of the disclosure may also be embodied as methods and/or computer program products. Accordingly, the disclosure may be embodied in hardware and/or in hardware/software (including firmware, resident software, microcode, etc.). Furthermore, the embodiments may take the form of a computer program product on a computer-usable or computer-readable storage medium having computer-usable or computer-readable program code embodied in the medium for use by or in connection with an instruction execution system. Such instruction execution system may be implemented in a standalone or distributed manner. The actual software code or specialized control hardware used to implement embodiments described herein is not limiting of the disclosure. Thus, the operation and behavior of the aspects were described without reference to the specific software code, it being understood that those skilled in the art will be able to design software and control hardware to implement the aspects based on the description herein.

Furthermore, certain portions of the disclosure may be implemented as "logic" that performs one or more functions. This logic may include hardware, such as an application specific integrated circuit or field programmable gate array or a combination of hardware and software.

It should be emphasized that the term "comprises/comprising" when used in this specification is taken to specify the presence of stated features, integers, steps, components or groups but does not preclude the presence or addition of one or more other features, integers, steps, components or groups thereof.

No element, act, or instruction used in the disclosure should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description gives only the embodiments of the present disclosure and is not intended to limit the present disclosure in any way. Thus, any modification, substitution, improvement or like made within the spirit and principle of the present disclosure should be encompassed by the scope of the present disclosure.

What is claimed is:

1. A method at a network entity for signaling Quality of Service, QoS, control parameters for a QoS Flow to a User Equipment, UE, comprising:
   generating one or more data flow rules associated with the QoS Flow, wherein each of the one or more data flow rules is generated based on one or more policy and charging control (PCC) rules and comprises parameters specific to a data flow that is bound to the QoS Flow;
   generating a QoS Flow profile for the QoS Flow, wherein the QoS Flow profile comprises parameters that are common to all data flows that are bound to the same QoS Flow, and wherein the parameters that are common to all data flows that are bound to the same QoS Flow are different than the parameters specific to the data flow that is bound to the QoS Flow; and
   transmitting the one or more data flow rules and the QoS Flow profile to the UE.

2. The method according to claim 1, wherein each of the one or more data flow rules are represented by an identifier that is differentiated from each of the one or more data flow rules and is transmitted to the UE.

3. The method according to claim 1, wherein each of the one or more data flow rules comprise parameters that are related to one or more Service Data Flow, SDF, templates and/or one or more associated precedence values.

4. The method according to claim 1, wherein each of the one or more data flow rules and the QoS Flow profile comprises an identifier of the QoS Flow.

5. The method according to claim 1, further comprising:
   transmitting the one or more data flow rules to the UE, to inform the UE to add the one or more data flow rules for the QoS flow.

6. The method according to claim 1, further comprising:
   transmitting at least one parameter to the UE if the at least one parameter in the QoS Flow profile changes from the at least one parameter in a previous QoS Flow profile, to enable the UE to update the at least one parameter in the QoS Flow profile for the QoS Flow.

7. The method according to claim 1, further comprising:
   transmitting an identifier of a data flow rule to the UE, to inform the UE to delete the data flow rule identified by the identifier.

8. The method according to claim 1, further comprising:
   transmitting an identifier of the QoS Flow to the UE if a data flow rule to be removed is a last rule of the QoS Flow, to inform the UE to delete the QoS Flow profile for the QoS Flow and the last data flow rule.

9. A method at a User Equipment, UE, comprising:
   receiving one or more data flow rules associated with a Quality of Service, QoS, Flow, wherein each of the one or more data flow rules is generated based on one or more policy and charging control (PCC) rules and comprises parameters specific to a data flow that is bound to the QoS Flow; and
   receiving a QoS Flow profile for the QoS Flow, wherein the QoS Flow profile comprises parameters that are common to all data flows that belong to the same QoS Flow, and wherein the parameters that are common to all data flows that are bound to the same QoS Flow are different than the parameters specific to the data flow that is bound to the QoS Flow.

10. The method according to claim 9, wherein each of the one or more data flow rules are represented by an identifier that is differentiated from each of the one or more data flow rules and is also received.

11. The method according to claim 9, wherein each of the one or more data flow rules and the QoS Flow profile comprises an identifier of the QoS Flow.

12. The method according to claim 9, further comprising:
   receiving an identifier of a data flow rule; and
   deleting the data flow rule.

13. The method according to claim 9, further comprising:
   receiving a data flow rule only.

14. The method according to claim 9, further comprising:
   receiving an identifier of a QoS Flow; and
   deleting the data flow rule and the QoS Flow profile associated with the QoS Flow.

15. The method according to claim 9, further comprising:
   receiving at least one parameter, and
   updating the at least one parameter in the QoS Flow profile with the received parameter.

16. A Network Function, NF, entity in a network, comprising:
   at least one processor, and
   a memory comprising instructions which, when executed by the at least one processor, cause the NF entity to:
   generate one or more data flow rules associated with a QoS Flow, wherein each of the one or more data flow rules is generated based on one or more policy and charging control (PCC) rules and comprises parameters specific to a data flow that is bound to the QoS Flow;

generate a QoS Flow profile to the UE for the QoS Flow, wherein the QoS Flow profile comprises parameters that are common to all data flows that belong to the same QoS Flow, and wherein the parameters that are common to all data flows that are bound to the same QoS Flow are different than the parameters specific to the data flow that is bound to the QoS Flow; and transmit the one or more data flow rules and the QoS Flow profile to the UE.

17. The NF entity according to claim 16, wherein the instructions which, when executed by the at least one processor, cause the NF entity to:

transmit the one or more data flow rules to the UE, to inform the UE to add the one or more data flow rules for the QoS flow.

18. The NF entity according to claim 16, wherein the instructions which, when executed by the at least one processor, cause the NF entity to:

transmit a parameter to the UE if the parameter in the QoS Flow profile changes from the at least one parameter in a previous QoS Flow profile, to enable the UE to update the parameter in the QoS Flow profile for the QoS Flow.

19. The NF entity according to claim 16, wherein the instructions which, when executed by the at least one processor, cause the NF entity to:

transmit an identifier of a data flow rule to the UE, to inform the UE to delete the data flow rule identified by the identifier.

20. The NF entity according to claim 16, wherein the instructions which, when executed by the at least one processor, cause the NF entity to:

transmit an identifier of the QoS Flow to the UE if a data flow rule to be removed is a last rule of the QoS Flow, to inform the UE to delete the QoS Flow profile for the QoS Flow and the last data flow rule.

21. A User Equipment, UE, comprising:

at least one processor, and a memory comprising instructions which, when executed by the at least one processor (1403), cause the UE to:

receive one or more data flow rules associated with a QoS Flow, wherein each of the one or more data flow rules is generated based on one or more policy and charging control (PCC) rules and comprises parameters specific to a data flow that is bound to the QoS Flow; and receive a QoS Flow profile for the QoS Flow, wherein the QoS Flow profile comprises parameters that are common to all data flows that belong to the same QoS Flow, and wherein the parameters that are common to all data flows that are bound to the same QoS Flow are different than the parameters specific to the data flow that is bound to the QoS Flow.

22. The UE according to claim 21, wherein the instructions which, when executed by the at least one processor, further cause the UE to:

receive an identifier of a data flow rule; and delete the data flow rule.

23. The UE according to claim 21, wherein the instructions which, when executed by the at least one processor, further cause the UE to:

receive a data flow rule only.

24. The UE according to claim 21, wherein the instructions which, when executed by the at least one processor, further cause the UE to:

receive an identifier of a QoS Flow; and delete the data flow rule and the QoS Flow profile associated with the QoS Flow.

25. The UE according to claim 21, wherein the instructions which, when executed by the at least one processor, further cause the UE to:

receive at least one parameter, and update the at least one parameter in the QoS Flow profile with the received parameter.

26. A computer readable storage medium comprising computer program instructions stored thereon, the computer program instructions, when executed by at least one processor in a device, causing the device to perform the method according to claim 1.

* * * * *